United States Patent
Zurbruegg et al.

(10) Patent No.: US 11,543,005 B2
(45) Date of Patent: Jan. 3, 2023

(54) ELECTRONIC CVT WITH FRICTION CLUTCH

(71) Applicant: Polaris Industries Inc., Medina, MN (US)

(72) Inventors: Ronald Zurbruegg, Spiez (CH); Hans-Rudolf Jenni, Grasswil (CH); Marcel Frei, Muenchenbuchsee (CH)

(73) Assignee: Polaris Industries Inc., Medina, MN (US)

( * ) Notice: Subject to any disclaimer, the term of this patent is extended or adjusted under 35 U.S.C. 154(b) by 961 days.

(21) Appl. No.: 16/356,472

(22) Filed: Mar. 18, 2019

(65) Prior Publication Data

US 2019/0285150 A1  Sep. 19, 2019

Related U.S. Application Data

(60) Provisional application No. 62/644,749, filed on Mar. 19, 2018.

(51) Int. Cl.
| | |
|---|---|
| *F16H 9/18* | (2006.01) |
| *F16H 63/06* | (2006.01) |
| *F16D 13/52* | (2006.01) |
| *F16H 61/662* | (2006.01) |
| *F16H 25/20* | (2006.01) |

(52) U.S. Cl.
CPC .............. *F16H 9/18* (2013.01); *F16D 13/52* (2013.01); *F16H 25/20* (2013.01); *F16H 61/662* (2013.01); *F16H 63/062* (2013.01); *F16H 2025/2081* (2013.01)

(58) Field of Classification Search
CPC ................................ F16H 9/18; F16H 63/062
See application file for complete search history.

(56) References Cited

U.S. PATENT DOCUMENTS

| | | |
|---|---|---|
| 62,016 A | 2/1867 | Custer |
| 2,953,032 A | 9/1960 | Ruess |
| 3,467,177 A | 9/1969 | Hoddinott |
| 3,789,684 A | 2/1974 | Freier |

(Continued)

FOREIGN PATENT DOCUMENTS

| | | |
|---|---|---|
| CA | 2807101 A1 | 8/2013 |
| CN | 101372930 A | 2/2009 |

(Continued)

OTHER PUBLICATIONS

International Preliminary Report on Patentability issued by The International Searching Authority, dated Mar. 31, 2020, for International Patent Application No. PCT/US2019/022706; 18 pages.

(Continued)

*Primary Examiner* — Terence Boes
(74) *Attorney, Agent, or Firm* — Faegre Drinker Biddle & Reath LLP

(57) ABSTRACT

A continuously variable transmission ("CVT") is provided for use on a recreational or utility vehicle. The CVT is electronically controlled by a control unit of the vehicle. The CVT includes a primary clutch having a first sheave, a second sheave movable relative to the first sheave, and a (Continued)

friction clutch. An actuator assembly is configured to actuate the primary clutch and cause movement of the second sheave.

26 Claims, 24 Drawing Sheets

(56) References Cited

U.S. PATENT DOCUMENTS

| | | | |
|---|---|---|---|
| 3,861,229 A | 1/1975 | Domaas | |
| 3,943,785 A | 3/1976 | Percifield | |
| 4,395,249 A | 7/1983 | Prasad et al. | |
| 4,422,498 A | 12/1983 | Chen | |
| 4,493,677 A | 1/1985 | Ikenoya | |
| 4,531,928 A | 7/1985 | Ikenoya | |
| 4,560,369 A * | 12/1985 | Hattori | F16H 37/021 474/28 |
| 4,594,537 A | 6/1986 | Arifian et al. | |
| 4,596,537 A | 6/1986 | Lin | |
| 4,631,977 A | 12/1986 | Kawashima | |
| 4,632,070 A | 12/1986 | Onda et al. | |
| 4,645,028 A | 2/1987 | Kawashima | |
| 4,671,781 A | 6/1987 | Tanaka et al. | |
| 4,671,782 A | 6/1987 | Ochiai et al. | |
| 4,697,665 A | 10/1987 | Eastman et al. | |
| 4,708,699 A | 11/1987 | Takano et al. | |
| 4,712,629 A | 12/1987 | Takahashi et al. | |
| 4,905,461 A | 3/1990 | Heuer | |
| 5,086,858 A | 2/1992 | Mizuta et al. | |
| 5,152,361 A | 10/1992 | Hasegawa et al. | |
| 5,976,044 A | 11/1999 | Kuyama | |
| 6,149,540 A | 11/2000 | Johnson et al. | |
| 6,176,796 B1 | 1/2001 | Lislegard | |
| 6,189,412 B1 | 2/2001 | Tsubata et al. | |
| 6,267,700 B1 | 7/2001 | Takayama | |
| 6,338,688 B1 | 1/2002 | Minami et al. | |
| 6,398,680 B1 | 6/2002 | Onogi | |
| 6,468,170 B1 * | 10/2002 | Ito | F16H 63/067 474/18 |
| 6,820,708 B2 | 11/2004 | Nakamura | |
| 6,848,348 B2 | 2/2005 | Liao | |
| 6,938,508 B1 | 9/2005 | Saagge | |
| 6,938,676 B2 | 9/2005 | Lan et al. | |
| 7,002,454 B1 | 2/2006 | Gustafson | |
| 7,070,527 B1 | 7/2006 | Saagge | |
| 7,086,837 B2 | 8/2006 | Kamoshita et al. | |
| 7,363,999 B2 | 4/2008 | Hastings | |
| 7,392,893 B2 | 7/2008 | Inomoto et al. | |
| 7,427,248 B2 | 9/2008 | Chonan | |
| 7,438,147 B2 | 10/2008 | Kato et al. | |
| 7,686,123 B2 | 3/2010 | Ishida | |
| 7,771,299 B2 | 8/2010 | Mochizuki et al. | |
| 8,002,061 B2 | 8/2011 | Yamamura et al. | |
| 8,104,524 B2 | 1/2012 | Manesh et al. | |
| 8,109,308 B2 | 2/2012 | Manesh et al. | |
| 8,157,039 B2 | 4/2012 | Melvin et al. | |
| 8,176,957 B2 | 5/2012 | Manesh et al. | |
| 8,256,563 B2 | 9/2012 | Suzuki et al. | |
| 8,381,855 B2 | 2/2013 | Suzuki et al. | |
| 8,382,620 B2 | 2/2013 | Morita | |
| 8,439,141 B2 | 5/2013 | Bessho et al. | |
| 8,459,397 B2 | 6/2013 | Bessho et al. | |
| 8,534,413 B2 | 9/2013 | Nelson | |
| 8,556,015 B2 | 10/2013 | Itoo et al. | |
| 8,596,406 B2 | 12/2013 | Itoo et al. | |
| 8,613,335 B2 | 12/2013 | Deckard et al. | |
| 8,834,307 B2 | 9/2014 | Itoo et al. | |
| 8,840,496 B2 | 9/2014 | Yamanishi et al. | |
| 8,911,312 B2 | 12/2014 | Itoo et al. | |
| 8,950,290 B2 | 2/2015 | Dieter et al. | |
| 8,997,908 B2 | 4/2015 | Kinsman et al. | |
| 9,108,470 B2 | 8/2015 | Tercha et al. | |
| 9,341,255 B2 | 5/2016 | Itoo et al. | |
| 9,366,331 B2 | 6/2016 | Eberhardt | |
| 9,453,573 B2 | 9/2016 | Renner et al. | |
| 9,566,858 B2 | 2/2017 | Hicke et al. | |
| 9,718,351 B2 | 8/2017 | Ripley et al. | |
| 9,863,523 B2 | 1/2018 | Stocks et al. | |
| 9,909,659 B2 | 3/2018 | Bessho et al. | |
| 10,183,605 B2 | 1/2019 | Weber et al. | |
| 10,246,153 B2 | 4/2019 | Deckard et al. | |
| 10,369,861 B2 | 8/2019 | Deckard et al. | |
| 2004/0094343 A1 | 5/2004 | Fukuda | |
| 2004/0195019 A1 | 10/2004 | Kato et al. | |
| 2004/0195034 A1 | 10/2004 | Kato et al. | |
| 2004/0224806 A1 | 11/2004 | Chonan | |
| 2006/0032690 A1 | 2/2006 | Inomoto et al. | |
| 2006/0090942 A1 | 5/2006 | Hastings | |
| 2006/0270503 A1 | 11/2006 | Suzuki et al. | |
| 2007/0219030 A1 | 9/2007 | Ho | |
| 2008/0283326 A1 | 11/2008 | Bennett et al. | |
| 2008/0314676 A1 | 12/2008 | Ishida | |
| 2009/0175863 A1 | 7/2009 | Kraus et al. | |
| 2009/0298627 A1 | 12/2009 | Johnson et al. | |
| 2010/0155170 A1 | 6/2010 | Melvin et al. | |
| 2010/0184543 A1 | 7/2010 | Yamashita | |
| 2011/0094818 A1 | 4/2011 | Suzuki et al. | |
| 2012/0031693 A1 | 2/2012 | Deckard et al. | |
| 2012/0055728 A1 | 3/2012 | Bessho et al. | |
| 2012/0055729 A1 | 3/2012 | Bessho et al. | |
| 2012/0137828 A1 | 6/2012 | Dieter et al. | |
| 2012/0289370 A1 | 11/2012 | Yamanishi et al. | |
| 2012/0316933 A1 | 12/2012 | Pentland et al. | |
| 2013/0033070 A1 | 2/2013 | Kinsman et al. | |
| 2013/0087403 A1 | 4/2013 | Itoo et al. | |
| 2013/0090198 A1 | 4/2013 | Itoo et al. | |
| 2013/0090199 A1 | 4/2013 | Itoo et al. | |
| 2013/0092468 A1 * | 4/2013 | Nelson | B60W 10/107 474/43 |
| 2013/0158823 A1 * | 6/2013 | Dec | F16H 61/66259 474/43 |
| 2013/0220766 A1 | 8/2013 | Tadych et al. | |
| 2013/0240272 A1 | 9/2013 | Gass et al. | |
| 2014/0243125 A1 | 8/2014 | Koga | |
| 2014/0262584 A1 | 9/2014 | Lovold et al. | |
| 2014/0348671 A1 | 11/2014 | Pagliarin | |
| 2015/0011344 A1 * | 1/2015 | Ebihara | F16H 63/062 474/8 |
| 2015/0024890 A1 | 1/2015 | Eberhardt | |
| 2015/0061275 A1 | 3/2015 | Deckard et al. | |
| 2015/0308561 A1 | 10/2015 | Itoo et al. | |
| 2015/0377341 A1 | 12/2015 | Renner et al. | |
| 2016/0061088 A1 | 3/2016 | Minnichsoffer et al. | |
| 2016/0061314 A1 | 3/2016 | Kuhl et al. | |
| 2016/0176283 A1 | 6/2016 | Hicke et al. | |
| 2016/0176284 A1 | 6/2016 | Nugteren et al. | |
| 2016/0176287 A1 | 6/2016 | Ripley et al. | |
| 2016/0215878 A1 | 7/2016 | Hatajima | |
| 2017/0002920 A1 | 1/2017 | Bessho et al. | |
| 2017/0211467 A1 | 7/2017 | Hall et al. | |
| 2017/0268655 A1 * | 9/2017 | Stocks | F16H 9/14 |
| 2018/0178677 A1 | 6/2018 | Swain et al. | |
| 2018/0180163 A1 | 6/2018 | Schleif et al. | |
| 2018/0037212 A1 | 8/2018 | Beyer | |
| 2019/0093745 A1 | 3/2019 | Younggren et al. | |
| 2019/0193501 A1 | 6/2019 | Brady et al. | |
| 2019/0210457 A1 | 7/2019 | Galsworthy et al. | |
| 2019/0285159 A1 | 9/2019 | Nelson et al. | |
| 2019/0285160 A1 | 9/2019 | Nelson et al. | |
| 2020/0248793 A1 | 8/2020 | Kuhl et al. | |
| 2022/0082167 A1 | 3/2022 | Kuhl et al. | |

FOREIGN PATENT DOCUMENTS

| | | |
|---|---|---|
| CN | 101960175 A | 1/2011 |
| CN | 103032535 A | 4/2013 |
| CN | 103476621 A | 12/2013 |
| CN | 103486233 A | 1/2014 |
| CN | 103912664 A | 7/2014 |
| JP | 59-009365 A | 1/1984 |
| JP | 59-077924 A | 5/1984 |
| JP | 2009-228708 A | 10/2009 |
| JP | 5990365 B2 | 9/2016 |

(56) References Cited

FOREIGN PATENT DOCUMENTS

| WO | 2014/059258 A1 | 4/2014 |
|---|---|---|
| WO | 2018/118470 A1 | 6/2018 |
| WO | 2019/126485 A1 | 6/2019 |

OTHER PUBLICATIONS

"2011 Polaris Ranger RZR XP 900 First Look-Motorcycle USA", www.motorcycle-usa.com/2011/01/article/2011-polaris-ranger-rzr-xp-900-first-look/, Jan. 3, 2011; 10 pages.

"Alba Racing Belt Gauge", www.Maverickforums.net; 8 pages.

"The Avid Off Racing BITD/SCORE factory Can Am Maverick race build", www.Maverickforums.net; 31 pages.

"UTVOutpost.com-UTV Side by Side Parts, Accessories & Videos", http://www.utvoutpost.com/new-can-am-maverick-belt-cover-back-plate-transmission-clutch-cover-420612313; Jun. 29, 2015; 13 pages.

Decision Institution of Inter Partes Review 37 CFR .sctn. 42.108 issued by the U.S. Patent and Trademark Office Trial and Appeal Board, *Arctic Cat, Inc.* v. *Polaris Industries Inc.*, Feb. 3, 2016; 34 pages.

International Preliminary Report on Patentability received for PCT Patent Application No. PCT/US19/22912, dated Apr. 2, 2020, 24 pages.

International Preliminary Report on Patentability received for PCT Patent Application No. PCT/US2017/065520, dated Jul. 4, 2019, 9 pages.

International Preliminary Report on Patentability, issued by the European Patent Office, dated Apr. 14, 2015, for International Patent Application No. PCT/US2013/064516; 18 pages.

International Search Report and Written Opinion of the International Searching Authority, dated Mar. 25, 2014, for International Patent Application No. PCT/US2013/064516; 23 pages.

International Search Report and Written Opinion received for PCT Patent Application No. PCT/US19/22912, dated Jun. 20, 2019, 14 pages.

International Search Report and Written Opinion received for PCT Patent Application No. PCT/US2017/065520, dated Mar. 19, 2018, 10 pages.

Office Action issued by the Canadian Intellectual Property Office, dated Jul. 8, 2020, for Canadian Patent Application No. 3,046,825; 5 pages.

International Search Report issued by the International Searching Authority, dated May 17, 2019, for International Patent Application No. PCT/US2019/022706; 6 pages.

Written Opinion issued by the International Searching Authority, dated May 17, 2019, for International Patent Application No. PCT/US2019/022706; 4 pages.

\* cited by examiner

ELECTRONIC CVT WITH FRICTION CLUTCH

CROSS-REFERENCE TO RELATED APPLICATIONS

The present application claims priority to U.S. Provisional Patent Application Ser. No. 62/644,749, filed Mar. 19, 2018, entitled "ELECTRONIC CVT WITH FRICTION CLUTCH," the complete disclosure of which is expressly incorporated by reference herein.

FIELD OF THE DISCLOSURE

The present disclosure relates to electronically controlled transmissions, and more particularly to an electronically controlled continuously variable transmission (CVT) for recreational and utility vehicles.

BACKGROUND OF THE PRESENT DISCLOSURE

Some recreational vehicles, such as all-terrain vehicles ("ATVs"), utility vehicles, motorcycles, etc., include a continuously variable transmission ("CVT") which includes a primary clutch and a secondary clutch, each having a movable sheave and a stationary sheave, and a belt operably coupled to the primary and secondary clutches. In these vehicles, an actuator adjusts the position of one of the primary and secondary clutches of the CVT. The thrust requirement of the actuator for moving the clutch is generally dependent on the sliding friction between the movable sheave and the sliding coupling.

In some recreational vehicles with CVTs, the actuator is an electric motor which is used to move the sheave of the CVT. However, CVTs with electric motors adjusting the position of the sheaves typically provide clutching through engagement of the belt with the movable sheaves. This may cause the belt to wear and loosen, requiring more frequent service to the CVT.

SUMMARY OF THE PRESENT DISCLOSURE

The present application discloses that a friction clutch may instead be used to engage and disengage the CVT instead of clutching with the belt. The use of the friction clutch allows the belt to remain tight while incurring less wear.

According to one illustrated embodiment of the present disclosure, a continuously variable transmission ("CVT") is provided. The CVT comprises a drive clutch having a first shaft, a first stationary sheave supported by the first shaft, a first movable sheave supported by the first shaft, a movable hub supported by the first shaft, and a friction clutch positioned between the movable hub and the movable sheave. The CVT also comprises an actuator motor operably coupled to the drive clutch and configured to adjust a position of the movable hub relative to the first stationary sheave of the drive clutch.

According to another illustrated embodiment of the present disclosure, a continuously variable transmission ("CVT") is provided. The CVT comprises a drive clutch having a stationary sheave and a movable sheave, an actuator motor operably coupled to the drive clutch to adjust a position of the drive clutch, and a lead screw operably coupled to the drive clutch and the actuator motor. The lead screw is configured to engage the drive clutch in response to the actuator motor.

According to yet another illustrated embodiment of the present disclosure, a continuously variable transmission ("CVT") is provided. The CVT comprises a drive clutch having a first shaft, a first stationary sheave supported by the first shaft, a first movable sheave supported by the first shaft, a movable hub supported by the first shaft, and a friction clutch positioned between the movable hub and the first movable sheave. Additionally, the CVT comprises a belt configured to be drivingly coupled to the drive clutch. The CVT also comprises an actuator motor operably coupled to the drive clutch and configured to engage the friction clutch, and clutching occurs through the friction clutch.

According to still another illustrated embodiment of the present disclosure, a control system is provided for operating an electronically-controlled continuously variable transmission ("CVT") having a drive clutch including a movable sheave, a stationary sheave, a movable hub, and a friction clutch. The control system comprises an actuator motor, and a controller operably coupled to the actuator motor. The control is configured to actuate the actuator motor, adjust a position of the movable hub of the drive clutch relative to the stationary and movable sheaves of the drive clutch, and engage the friction clutch of the drive clutch.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to any vehicle with one or more ground-engaging members and a continuously variable transmission, including, but not limited to, all-terrain vehicles, motorcycles, snowmobiles, scooters, three-wheeled vehicles, and golf carts.

Figure 1:
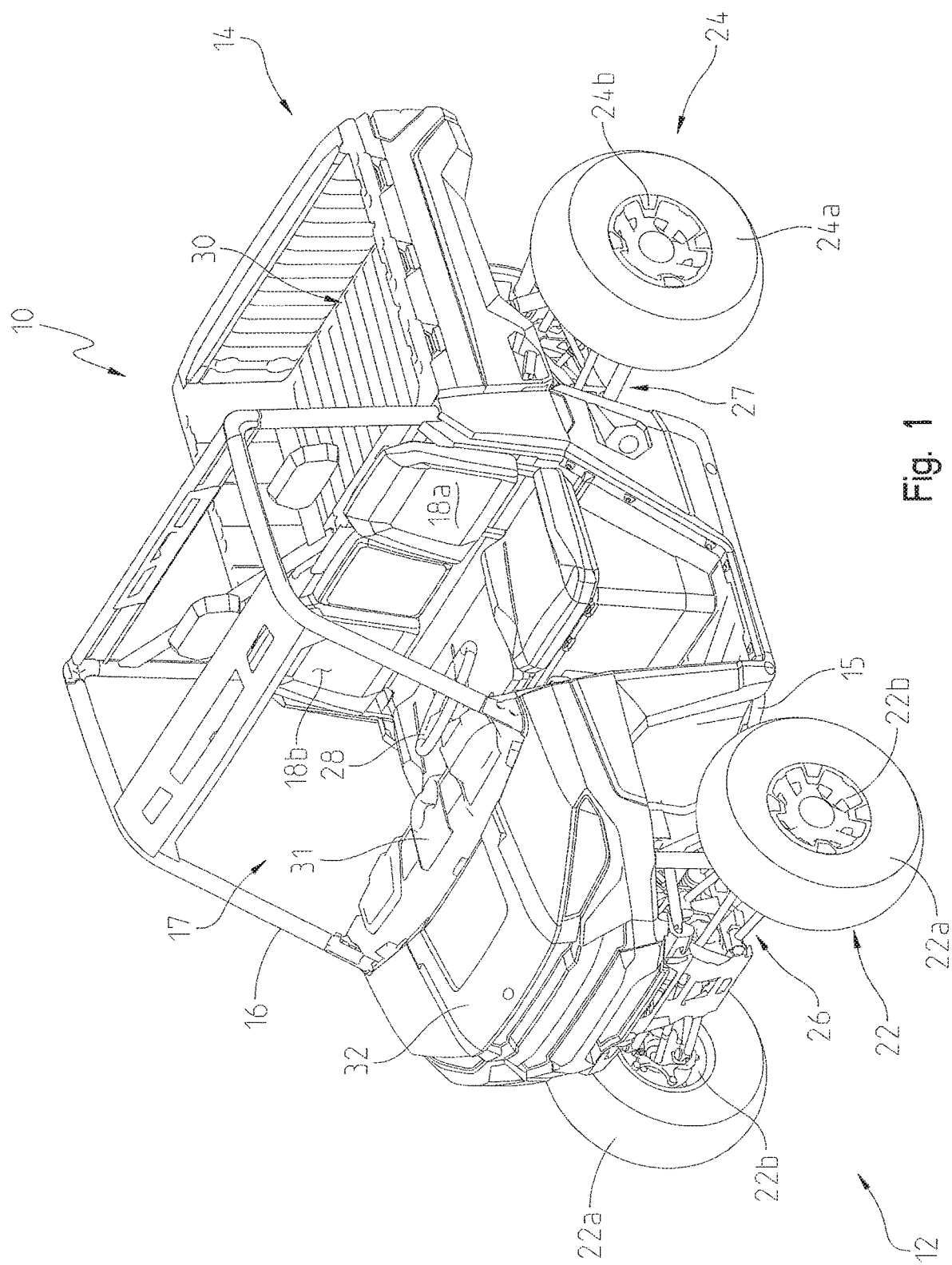
FIG. 1 is a front left perspective view of an illustrative vehicle incorporating an electronic continuously variable transmission ("CVT") of the present disclosure.

Referring initially to FIG. 1, an illustrative vehicle 10 having an electronically controlled continuously variable transmission ("CVT") is illustrated. Vehicle 10 is illustratively a side-by-side all-terrain vehicle ("ATV") or utility vehicle ("UV") 10 including a front end 12, a rear end 14, and a frame or chassis assembly 15 that is supported above the ground surface by a pair of front ground-engaging members 22 having tires 22a and wheels 22b and a pair of rear ground-engaging members 24 having tires 24a and wheels 24b. Vehicle 10 includes a pair of laterally spaced apart bucket seats 18a, 18b, although a bench style seat or any other style of seating structure may be used. Seats 18a, 18b are positioned within an operator area 17 of vehicle 10. An upper frame assembly 16 extends over operator area 17. Operator area 17 also includes front console or dash assembly 31 and a steering assembly 28. Front console 31 may include a tachometer, speedometer, or any other suitable instrument, gauge, or display for providing information to the operator and/or passenger(s).

Front end 12 of vehicle 10 includes a plurality of body panels, including a hood 32, and a front suspension assembly 26. Front suspension assembly 26 is operably coupled to front ground-engaging members 22 and frame assembly 15. Rear end 14 of vehicle 10 includes a rear suspension assembly 27 operably coupled to rear ground-engaging members 24 and frame assembly 15. Rear end 14 of vehicle 10 also includes a cargo area 30 positioned at least partially rearward of operator area 17.

Figure 2:
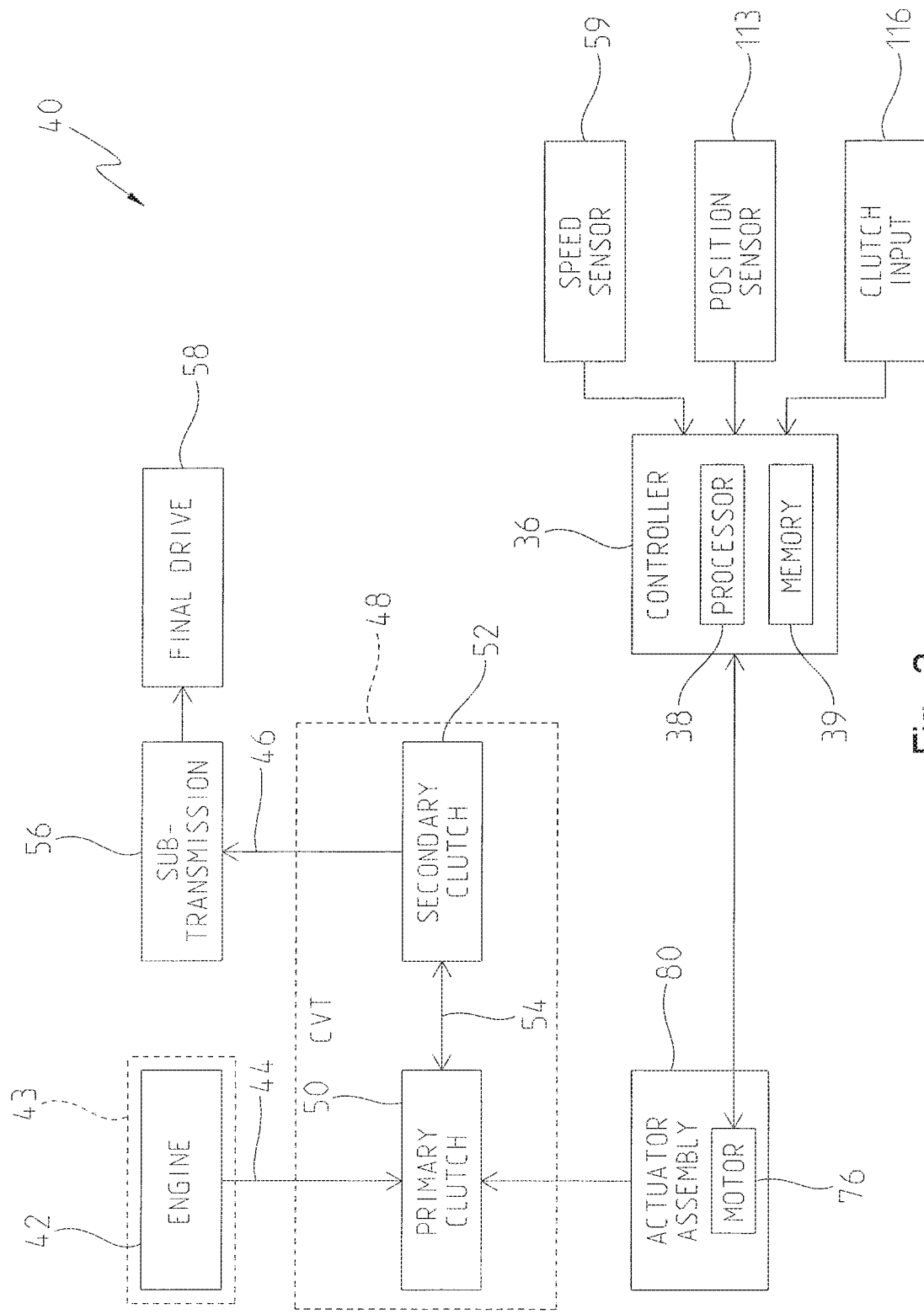
FIG. 2 is a schematic view of a drive system of the vehicle of FIG. 1 including the CVT.
Figure 3:
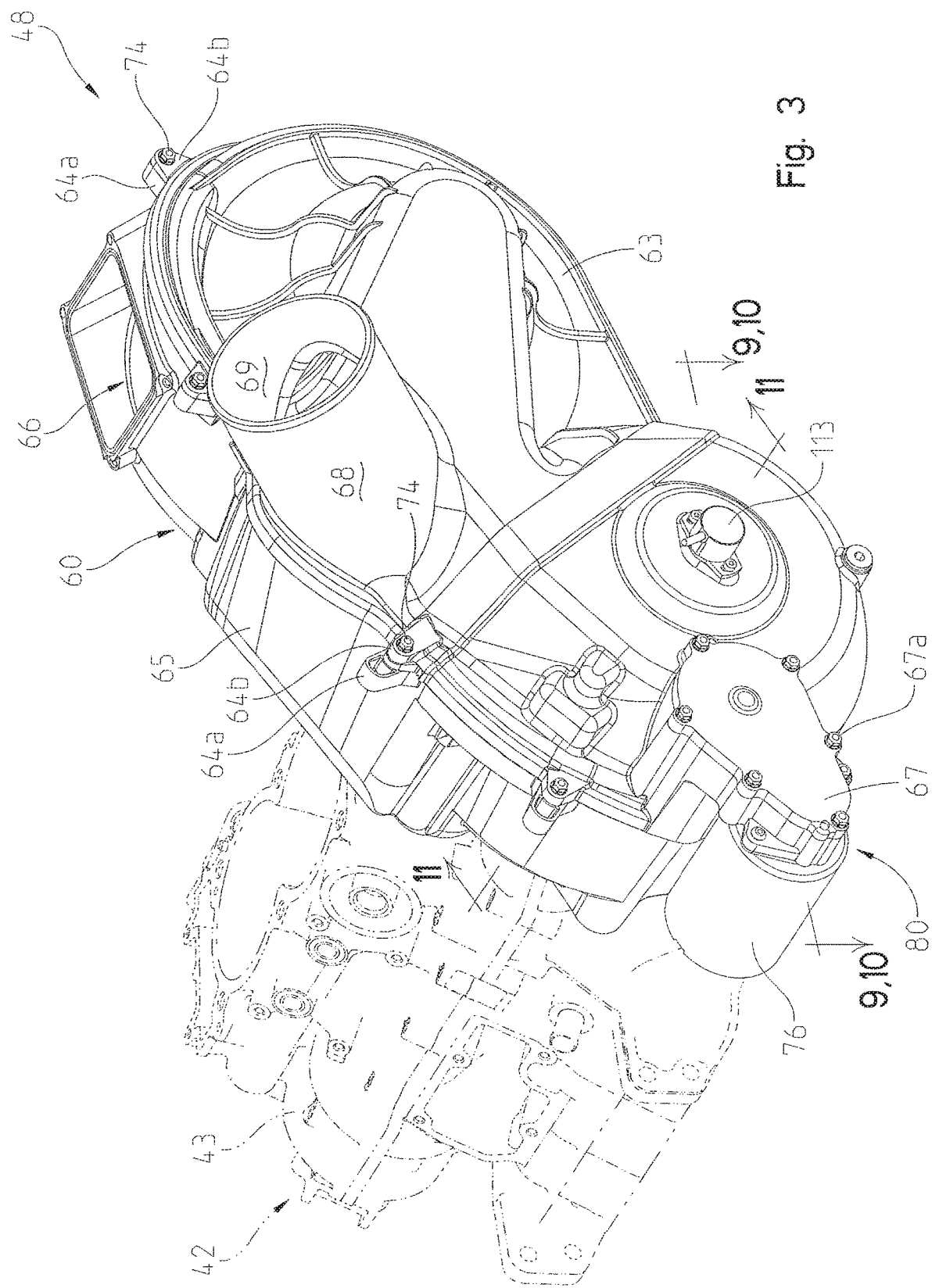
FIG. 3 is a front left perspective view of an embodiment of an engine and the CVT of the drive system of FIG. 2.
Figure 4:
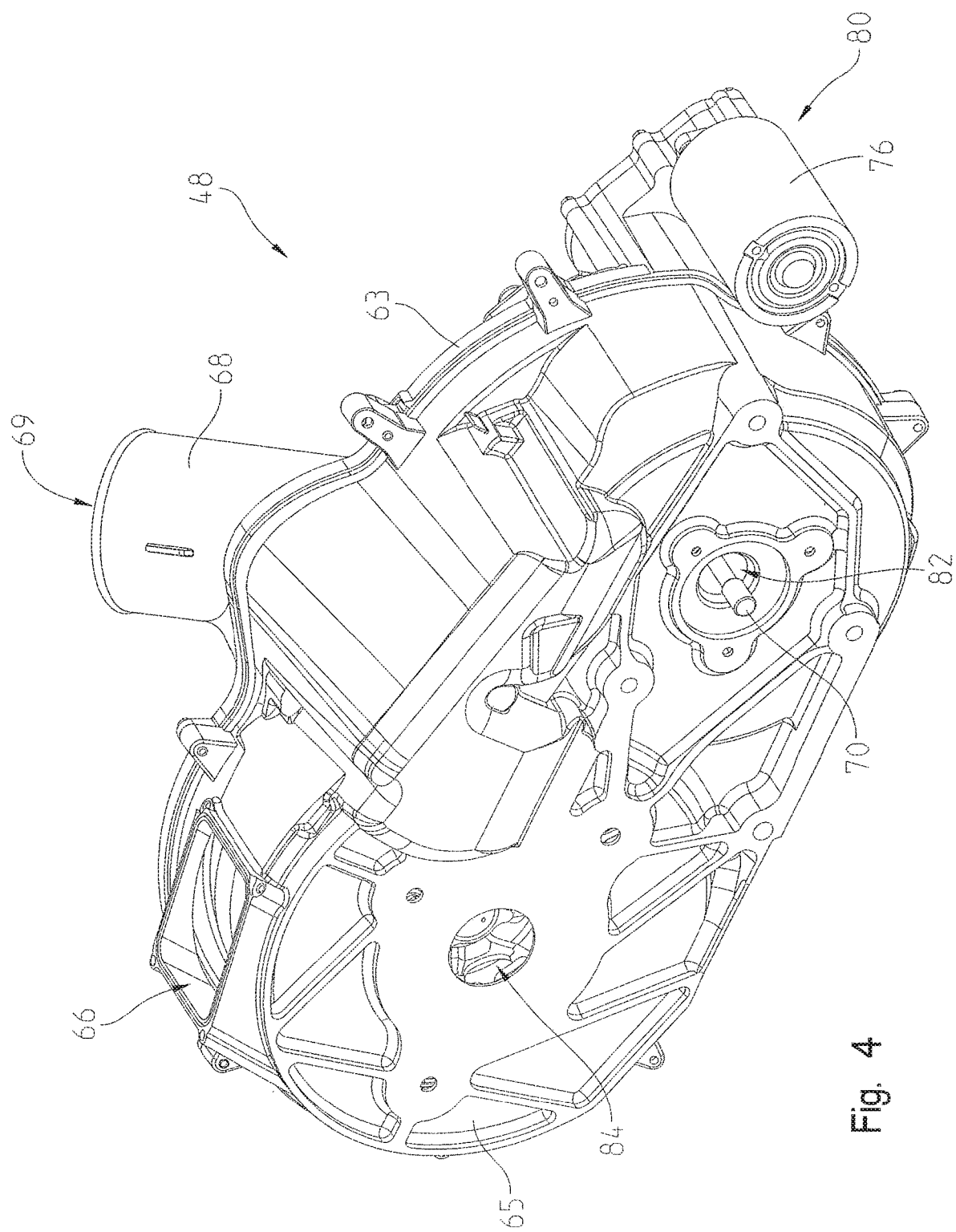
FIG. 4 is a front right perspective view of the CVT of FIG. 3.

Referring to FIG. 2, an illustrative driveline or drive assembly 40 of vehicle 10 includes an engine 42 and an electronically-actuated CVT 48. CVT 48 includes a primary or drive clutch 50 and a secondary or driven clutch 52. An endless, variable speed belt 54 is operably coupled to primary and secondary clutches 50, 52. Engine 42 includes an engine case or housing 43 and an output shaft 44 which is configured to drive primary clutch 50 of CVT 48. Rotation of primary clutch 50 is transferred to secondary clutch 52 via belt 54. An output shaft 46 of secondary clutch 52 is operably coupled to and drives a sub-transmission or a shiftable transmission or gearbox 56 which is operably coupled to a final drive or rear differential 58 for driving rear ground-engaging members 24 (see FIG. 1). In one embodiment, sub-transmission 56 is geared to provide a high gear, a low gear, a reverse gear, and a park configuration for vehicle 10 of FIG. 1. Fewer or additional gears may be provided with sub-transmission 56.

Still referring to FIG. 2, an actuator assembly 80 is configured to actuate primary clutch 50, as described herein. Actuator assembly 80 includes a motor 76 controlled by a control system including a controller 36. In one embodiment, motor 76 is an electrical stepper motor, although motor 76 may alternatively be a brushed motor or other suitable electrical or hydraulic motor. Controller 36 includes a processor 38 and a memory 39 accessible by processor 38 that contains software with instructions for controlling CVT 48. In one embodiment, controller 36 is part of an engine control unit (ECU) configured to control various operations of engine 42 and/or other components of drive assembly 40, although, in other embodiments, controller 36 may be a control unit separate from the ECU and configured to control operation of only CVT 48. In this embodiment, a clutch input 116 is coupled to controller 36, and controller 36 electronically controls motor 76 based on the detected clutch input 116 and/or other parameters of drive assembly 40 or vehicle 10. In one embodiment, controller 36 communicates with sensors/devices of vehicle 10, such as a speed sensor 59 or a position sensor 113, and/or other vehicle controllers via controller area network (CAN) communication. Speed sensor 59 may be configured to determine the rotational speed or position of a crankshaft of engine 42 and/or may be configured to determine the rotational speed of ground-engaging members 22, 24. Additionally, position sensor 113, as disclosed further herein, is configured to determine the position of at least a portion of primary clutch 50.

Figure 5:
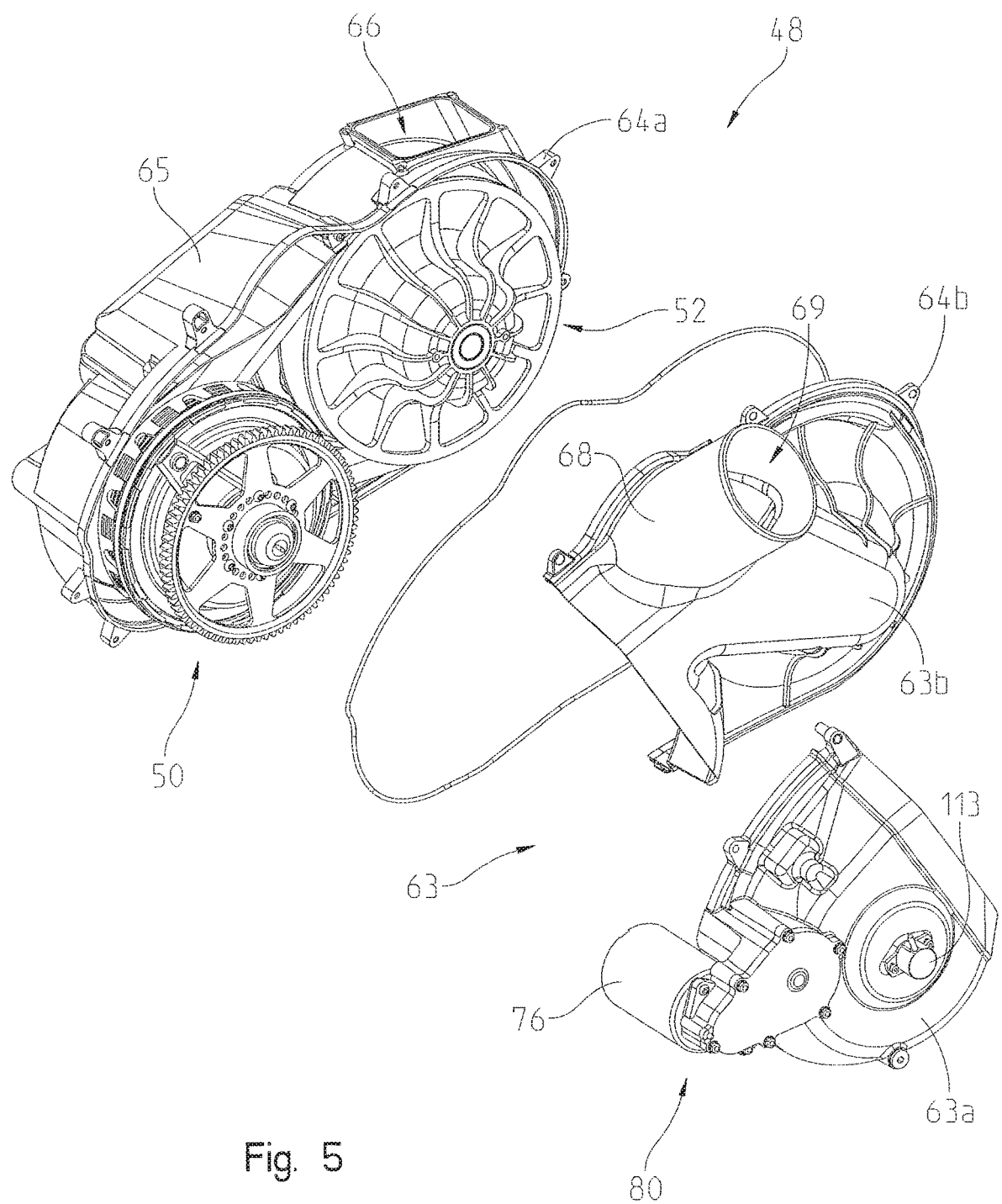
FIG. 5 is an exploded view of the CVT of FIG. 3 showing a drive clutch, a driven clutch, and an actuator assembly.
Figure 6:
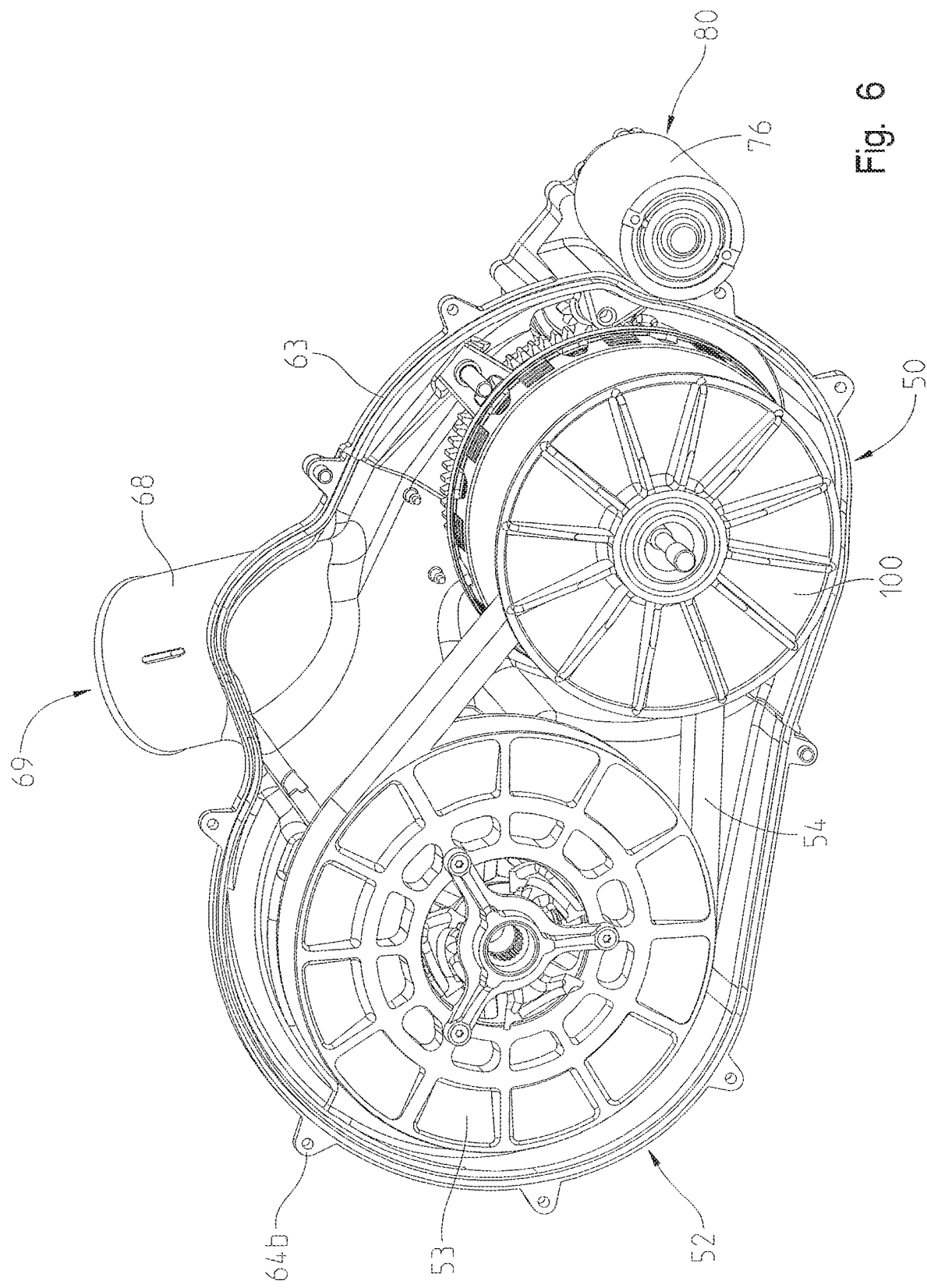
FIG. 6 is a right perspective view of the CVT with an inner cover removed and showing a stationary sheave of the drive clutch, a movable sheave of the driven clutch, and the actuator assembly of the CVT of FIG. 5.

Referring now to FIGS. 3-6, a housing 60 for CVT 48 is illustrated with an outer cover 63 coupled to an inner cover or back plate 65. Flanged portions 64a of inner cover 65 and flanged portions 64b of outer cover 63, respectively, are illustratively configured to receive fasteners 74 (see FIG. 3) to removably couple together outer cover 63 and inner cover 65. As illustrated in FIG. 5, outer cover 63 is adapted to be pulled away from inner cover 65 in a direction substantially perpendicular to the surface of inner cover 65. Fasteners 74 are illustratively bolts or screws, although other suitable fasteners 74 may be used. In various embodiments, housing 60 may be formed of diecast aluminum or other various materials.

Outer cover 63 includes an inlet duct portion 68 forming an opening 69 to provide cooling air to housing 60 of CVT 48. Inner cover 65 includes an outlet duct 66 allowing warm or hot air from the interior of housing 60 to be expelled from CVT 48 (see FIG. 5). In one embodiment, outlet duct 66 is integrally formed with inner cover 65 and inlet duct portion 68 is integrally formed with outer cover 63.

Figure 17:
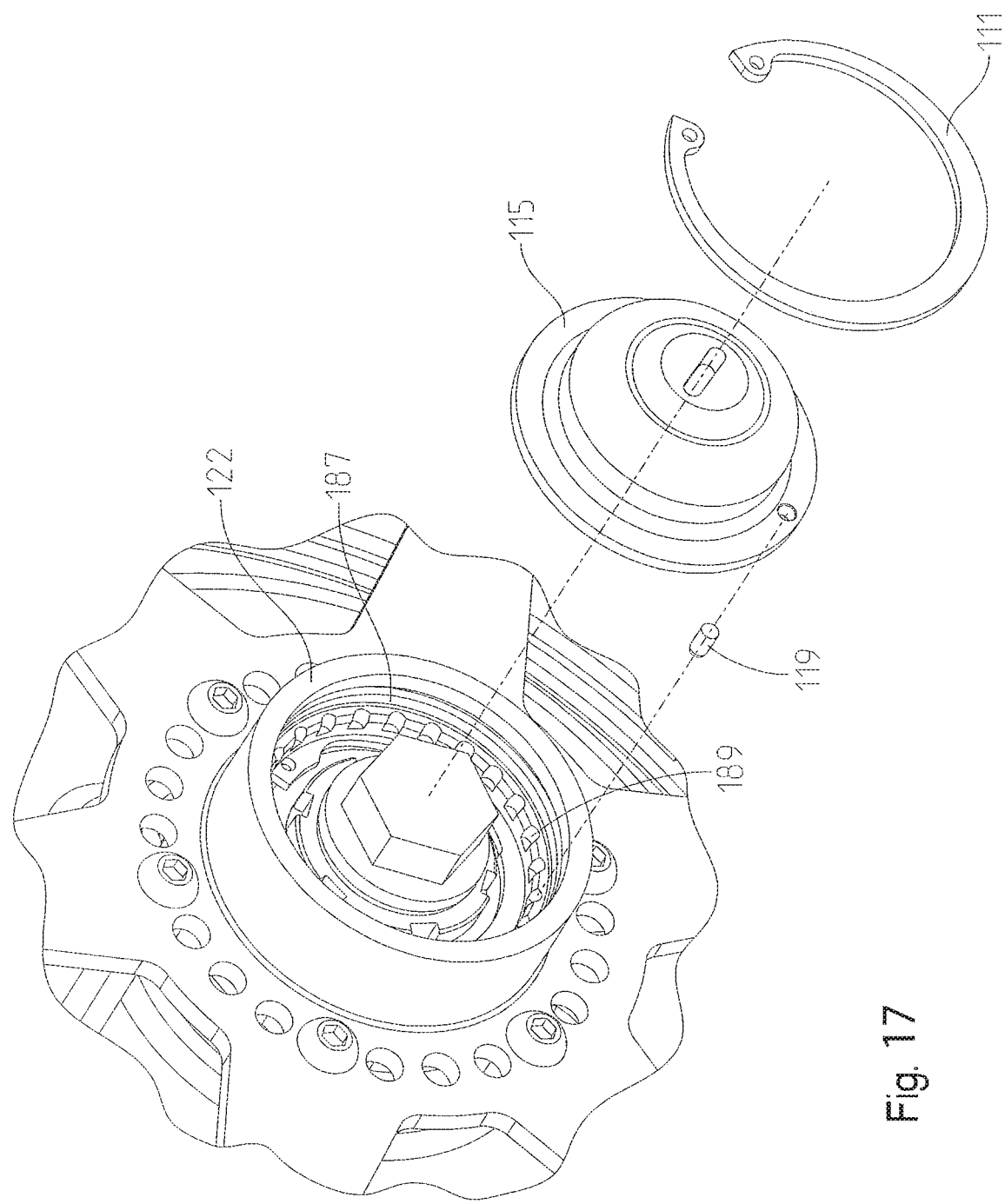
FIG. 17 is an exploded view of a support member of a position sensor operably coupled to the drive clutch of FIG. 5.

In various embodiments, outer cover 63 includes a first portion 63a and a second portion 63b (see FIG. 5). In addition, actuator assembly 80 generally includes a cover 67 coupled to outer cover 63, as shown in FIG. 17, and disclosed further herein. Cover 67 is illustratively coupled to outer cover 63 via fasteners 67a (FIG. 17) such that motor 76 of actuator assembly 80 may be serviceable without having to remove outer cover 63 in its entirety.

In the illustrated embodiment, secondary clutch 52 is a mechanically-controlled clutch and includes a stationary sheave 51 and a movable sheave 53 (see FIGS. 5-8). Additionally, primary clutch 50 includes a stationary sheave 100 and a movable sheave 102. Both movable sheaves 53, 102 are configured to move relative to stationary sheaves 51, 100, respectively, during operation of CVT 48. Additional information regarding primary and second clutches 50, 52 may be disclosed in U.S. Pat. No. 8,534,413, filed Feb. 17, 2012, and entitled "PRIMARY CLUTCH ELECTRONIC CVT", the complete disclosure of which is expressly incorporated by reference herein.

Figure 7:
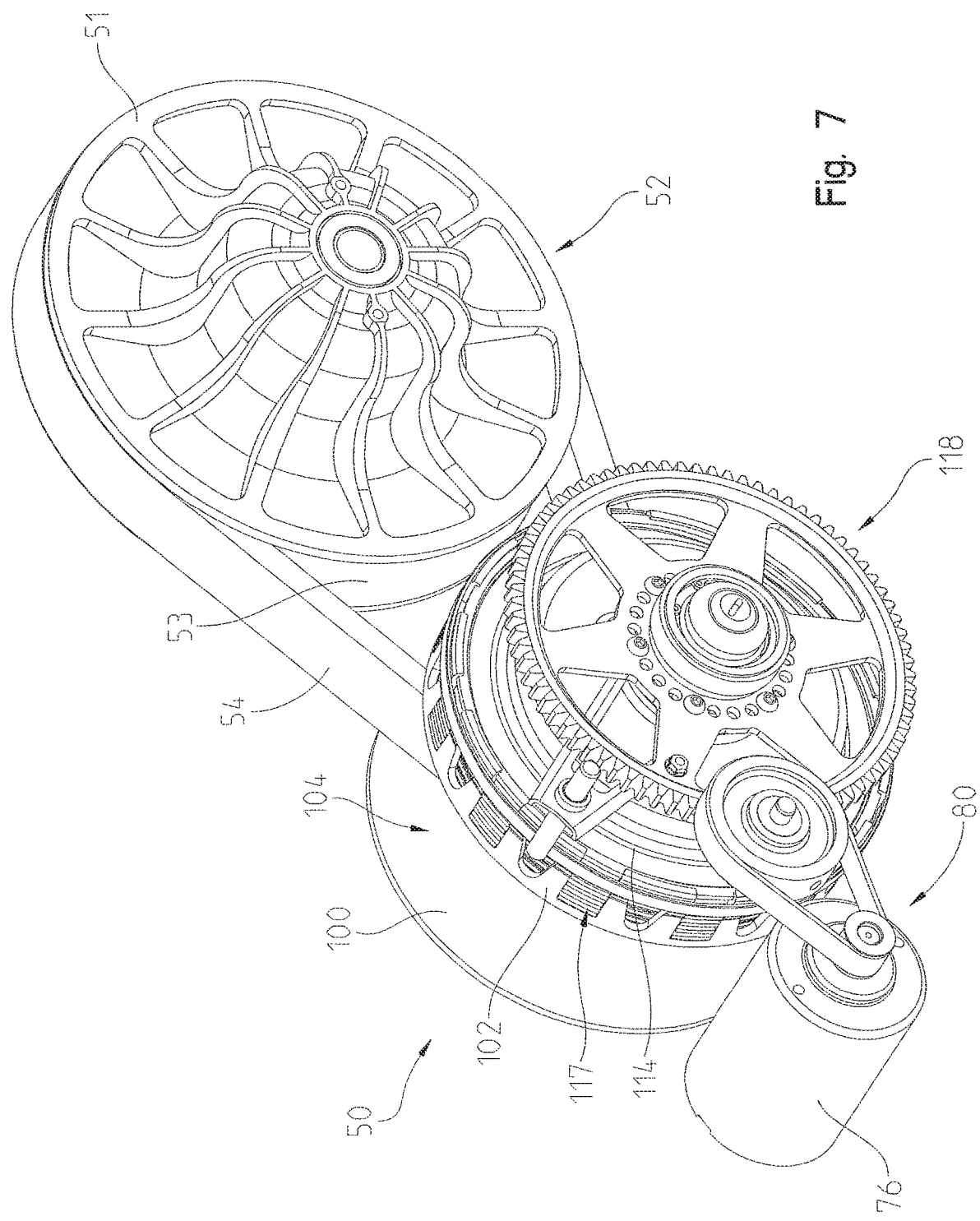
FIG. 7 is a front left perspective view of the actuator assembly, the drive clutch, and the driven clutch of FIG. 5.
Figure 8:
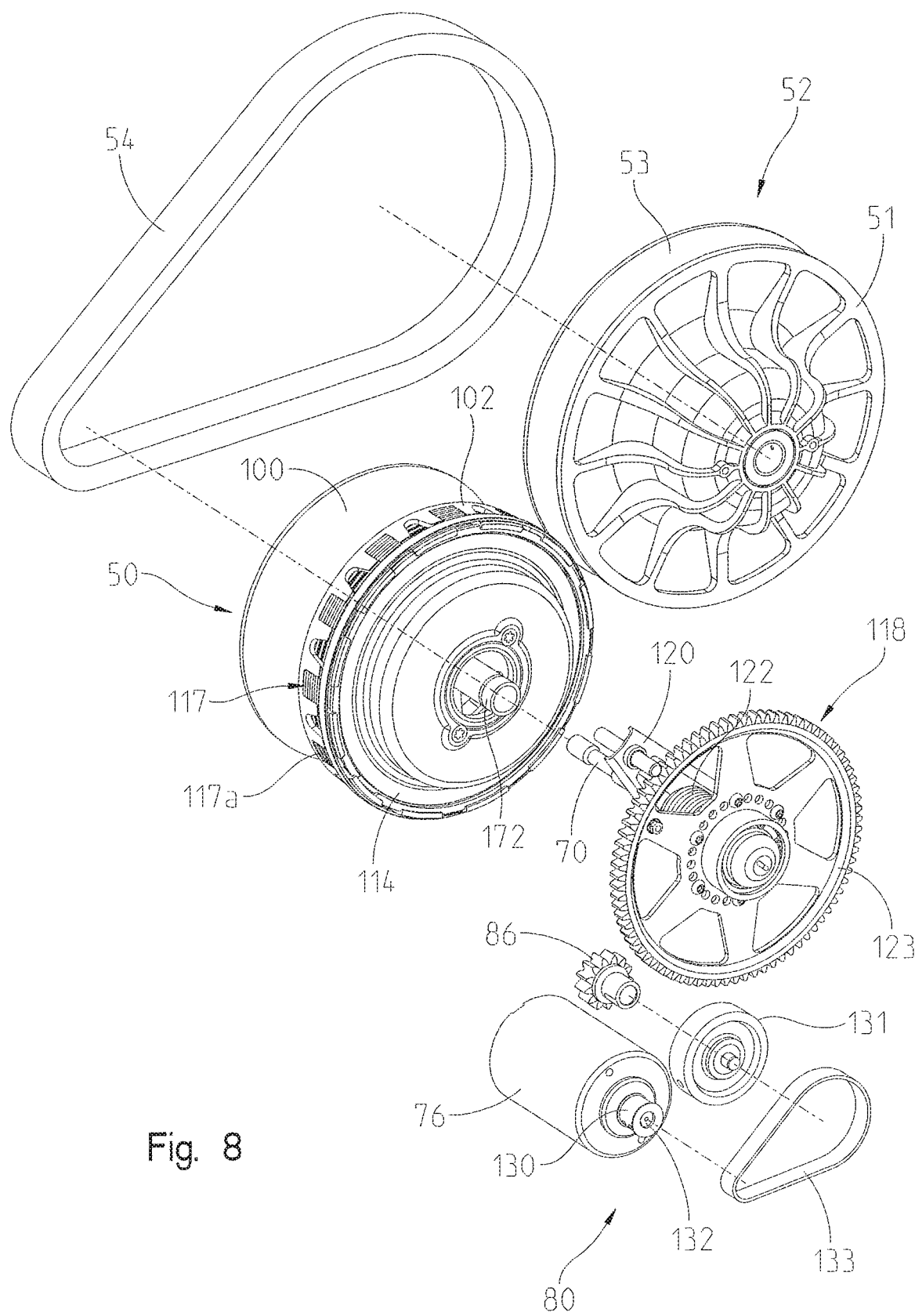
FIG. 8 is an exploded view of the actuator assembly, the drive clutch, and the driven clutch of FIG. 7.

More particularly, and as illustrated in FIGS. 7 and 8, primary clutch 50 includes an input shaft 172 (FIG. 8) which is driven by output shaft 44 of engine 42 (FIG. 2). In one embodiment, output shaft 44 may be the crankshaft of engine 42 or may be a separate shaft operably coupled to both the crankshaft and input shaft 172 of primary clutch 50. Additionally, secondary clutch 52 includes output shaft 46 (FIG. 2) which drives sub-transmission 56 (see FIG. 2). Belt 54 wraps around primary and secondary clutches 50, 52 and transfers rotational motion from primary clutch 50 to secondary clutch 52.

Referring to FIGS. 7-12, sheaves 100, 102 of primary clutch 50 are configured to rotate with shaft 172. Sheaves 100, 102 cooperate to define a slot 104 within which belt 54 rides. Slot 104 is substantially V-shaped due to slanted or angled belt-engaging surfaces 110, 112 of respective sheaves 100, 102 (see FIGS. 9 and 10). Accordingly, belt 54 has a substantially V-shaped cross-section which cooperates with surfaces 110, 112 of sheaves 100, 102 during operation of CVT 48.

Figure 9:
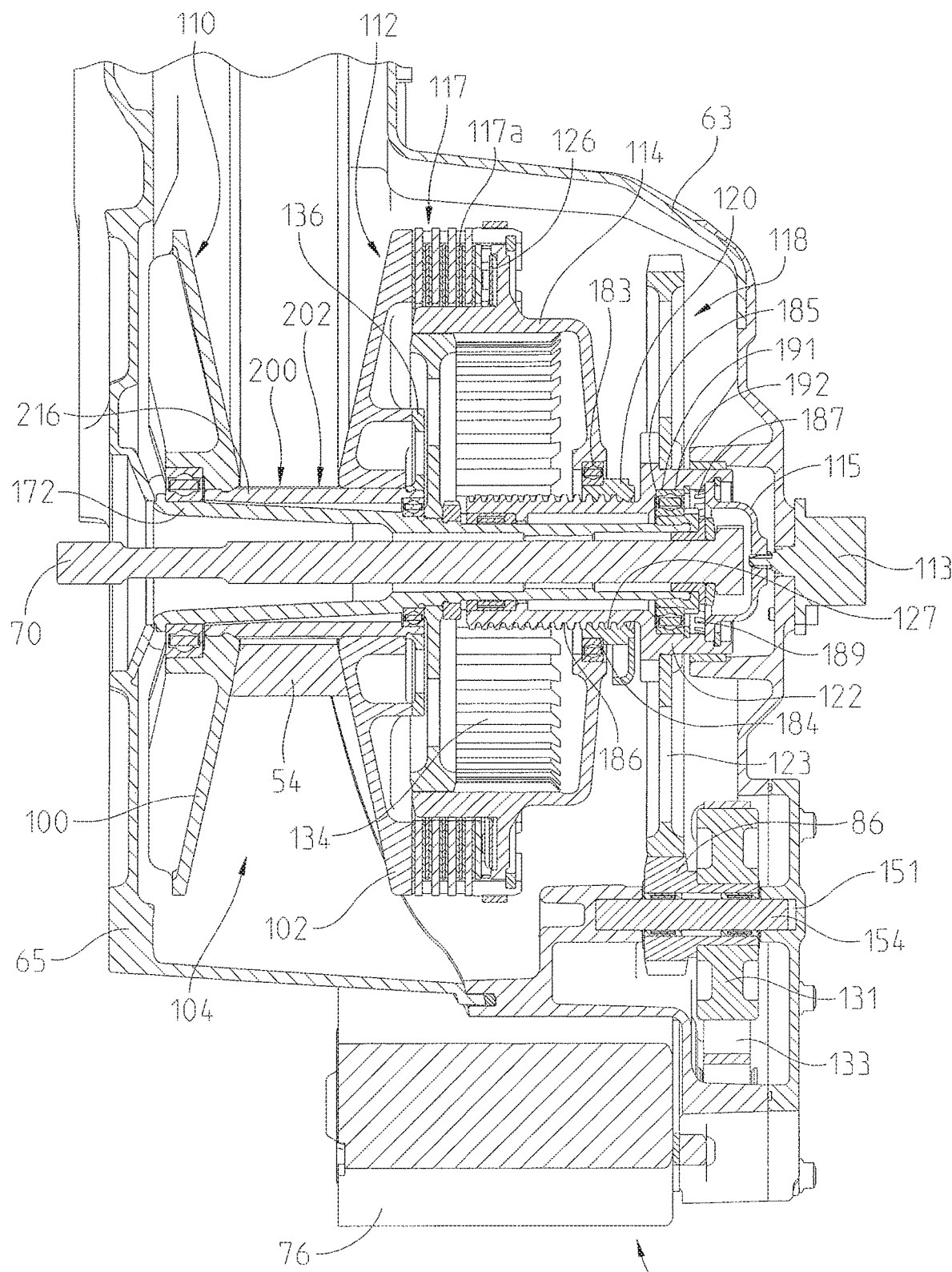
FIG. 9 is a cross-sectional view of the CVT of FIG. 3, taken along line 9-9 of FIG. 3, and showing the CVT in an open position.
Figure 10:
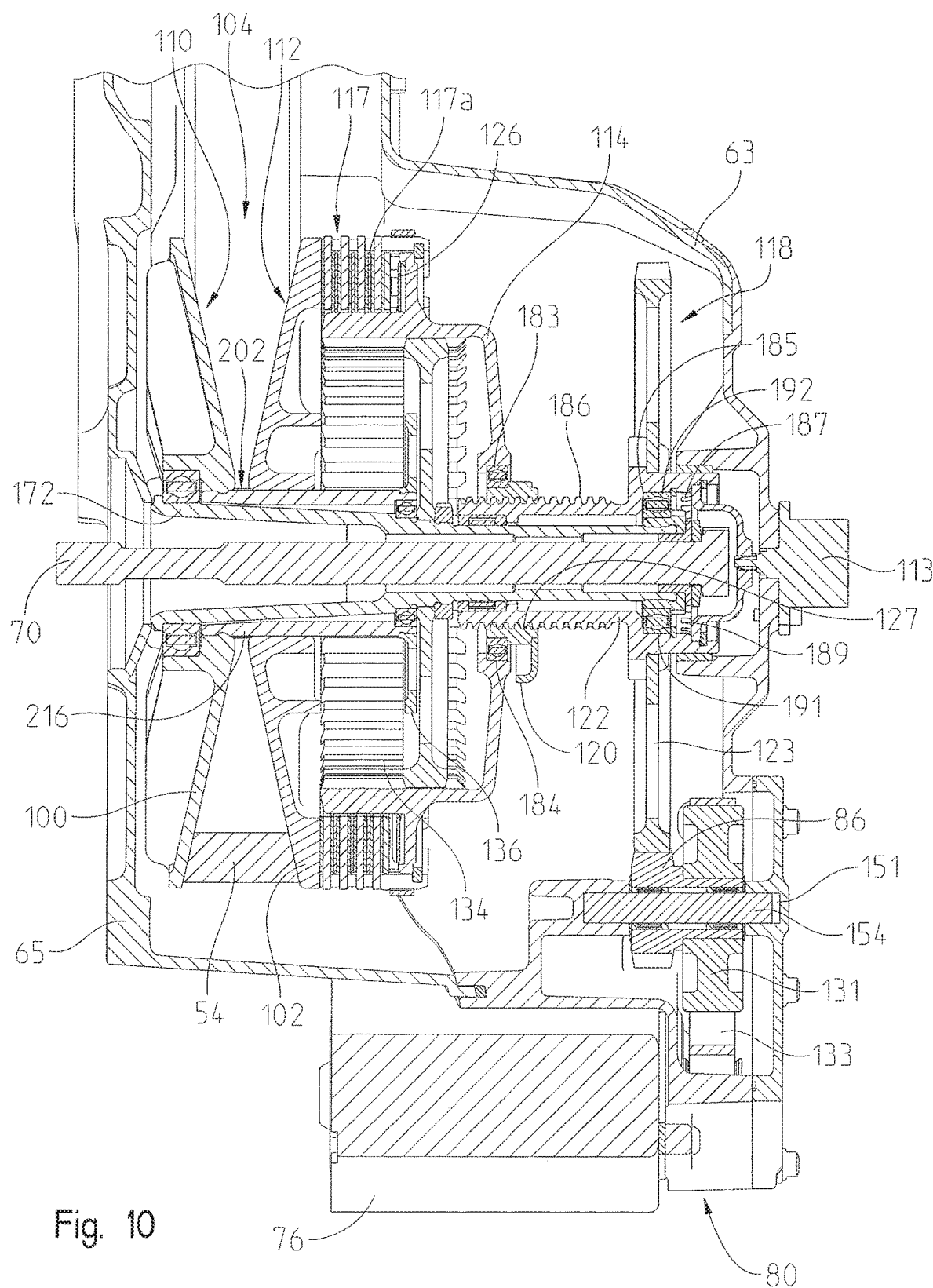
FIG. 10 is a cross-sectional view of the CVT of FIG. 3, taken along line 10-10 of FIG. 3, and showing the CVT in a closed position.

In the illustrated embodiment, sheave 100 is axially stationary in a direction parallel to an axis of shaft 172 and sheave 102 is axially movable in a direction parallel to the axis of shaft 172. In particular, sheave 102 is configured to slide along shaft 172 to a plurality of positions between a fully open position (see FIG. 9) and a fully closed position (see FIG. 10). With movable sheave 102 in a fully open position, slot 104 is at a maximum axial width between sheaves 100, 102, and belt 54 is positioned at its inner most race near the radial center of primary clutch 50, as illustrated in FIG. 9. With movable sheave 102 in a fully closed position, slot 104 is at a minimum axial width, and belt 54 is positioned at its outer most race near the outer periphery of primary clutch 50, as illustrated in FIG. 10. It may be appreciated that belt 54 is always in contact with sheaves 100, 102 and, therefore, is always engaged with at least movable sheave 102.

Movement of sheave 102 of primary clutch 50 and movement of movable sheave 53 of secondary clutch 52 provide variable effective gear ratios of CVT 48. In one embodiment, CVT 48 is configured to provide an infinite number of effective gear ratios between minimum and maximum gear ratios based on the positions of movable sheaves 100, 53 of respective clutches 50, 52. For example, when movable sheave 102 of primary clutch 50 is substantially open (FIG. 9) and movable sheave 53 of secondary clutch 52 is substantially closed, a low gear ratio is defined such that shaft 46 of secondary clutch 52 rotates slower than shaft 172 of primary clutch 50. Similarly, when movable sheave 102 of primary clutch 50 is substantially closed (FIG. 10) and movable sheave 53 of secondary clutch 52 is substantially open, a high gear ratio is defined such that shaft 46 of secondary clutch 52 rotates faster than shaft 172 of primary clutch 50.

As illustrated in FIGS. 7-12, primary clutch 50 further includes a movable hub 114, a friction clutch 117, and a lead screw assembly 118 including a first screw member 120, a second screw member 122, and a gear 123. As disclosed further herein, movable hub 114, friction clutch 117, and lead screw assembly 118 are operably coupled to actuator assembly 80 for operation of primary clutch 50. Friction clutch 117 includes at least one clutch disc 117a comprised at least partially of a friction material, and is positioned between movable hub 114 and movable sheave 102. In one embodiment, friction clutch 117 is defined by a plurality of clutch discs 117a which are axially adjacent to each other and may be retained at a position adjacent an outer surface of movable sheave 102 by a portion of movable sheave 102. The number of clutch discs 117a may vary depending on the desired behavior on the clutch. For example, the number of clutch discs 117a may be between 3-10. In various embodiments, a spring member 126 is positioned between friction clutch 117 and movable hub 114 (see FIGS. 9-12). In general, spring member 126 is configured to control the applied force to primary clutch 50 over a certain travel distance. Spring member 126 may be a wave washer or other similar spring member. In various embodiments, the spring constant or stiffness of spring member 126, the number of clutch discs 117a, and/or type or thickness of the friction material of clutch discs 117a may be changed to vary the behavior of friction clutch 117 for different vehicles and/or applications.

Figure 13:
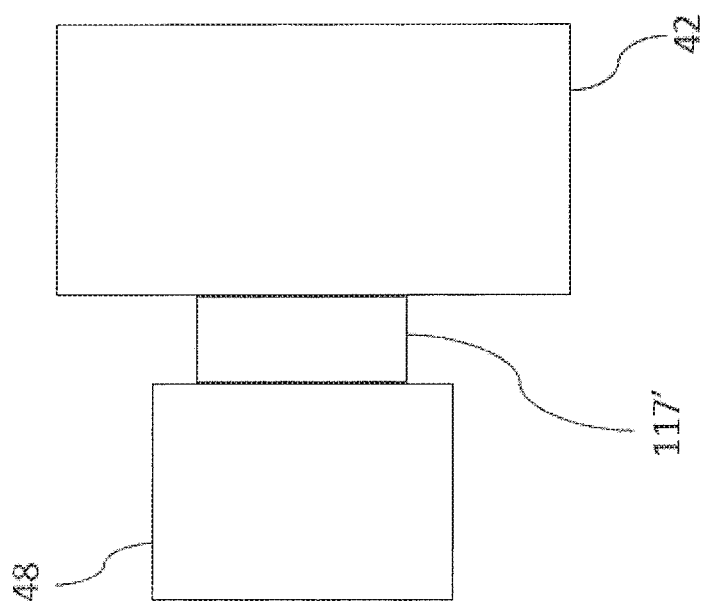
FIG. 13 is a schematic view of the positioning of a wet friction clutch between the CVT of FIG. 3 and an engine of the vehicle of FIG. 1.
Figure 14:
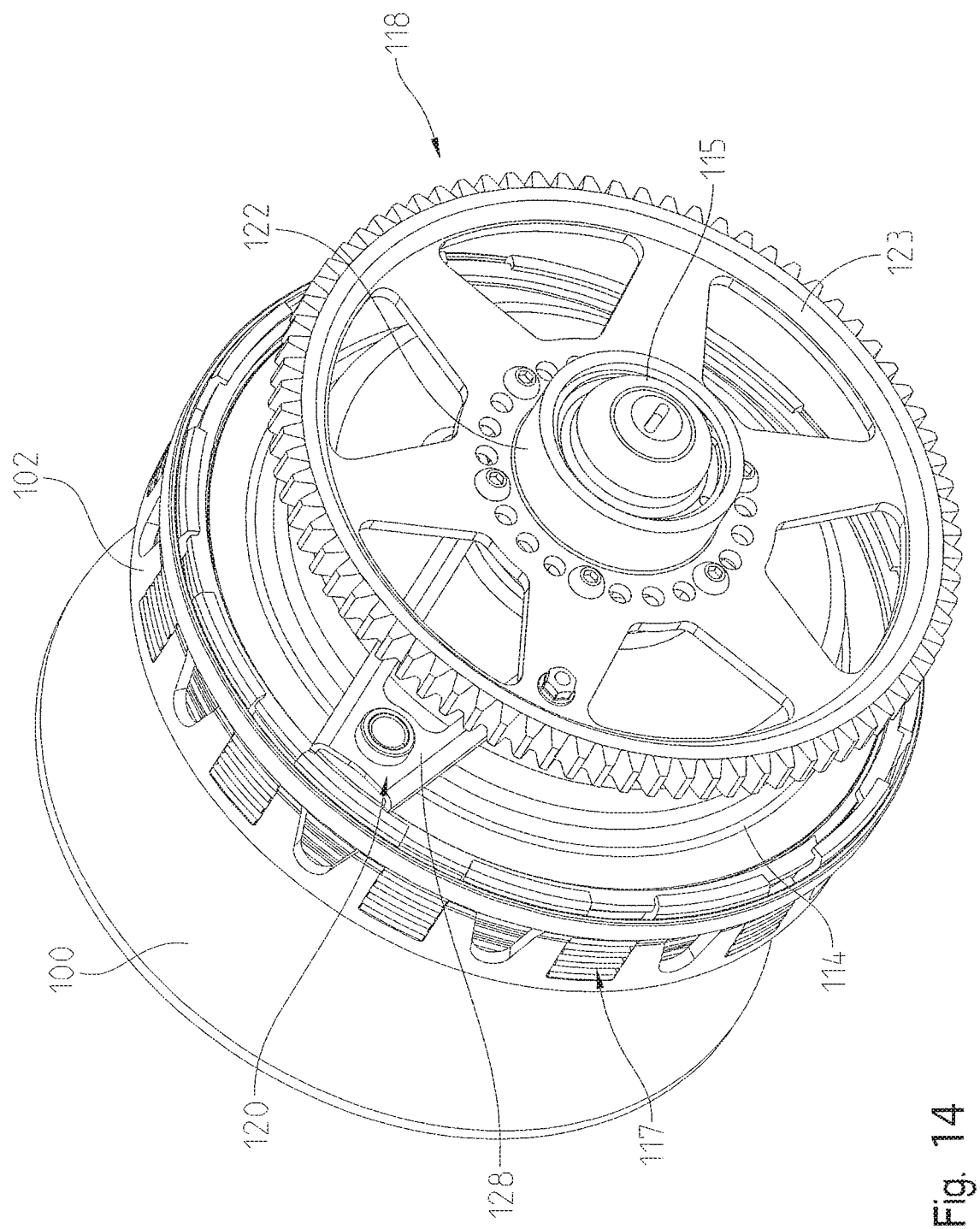
FIG. 14 is a front left perspective view of the drive clutch of FIG. 5.
Figure 15:
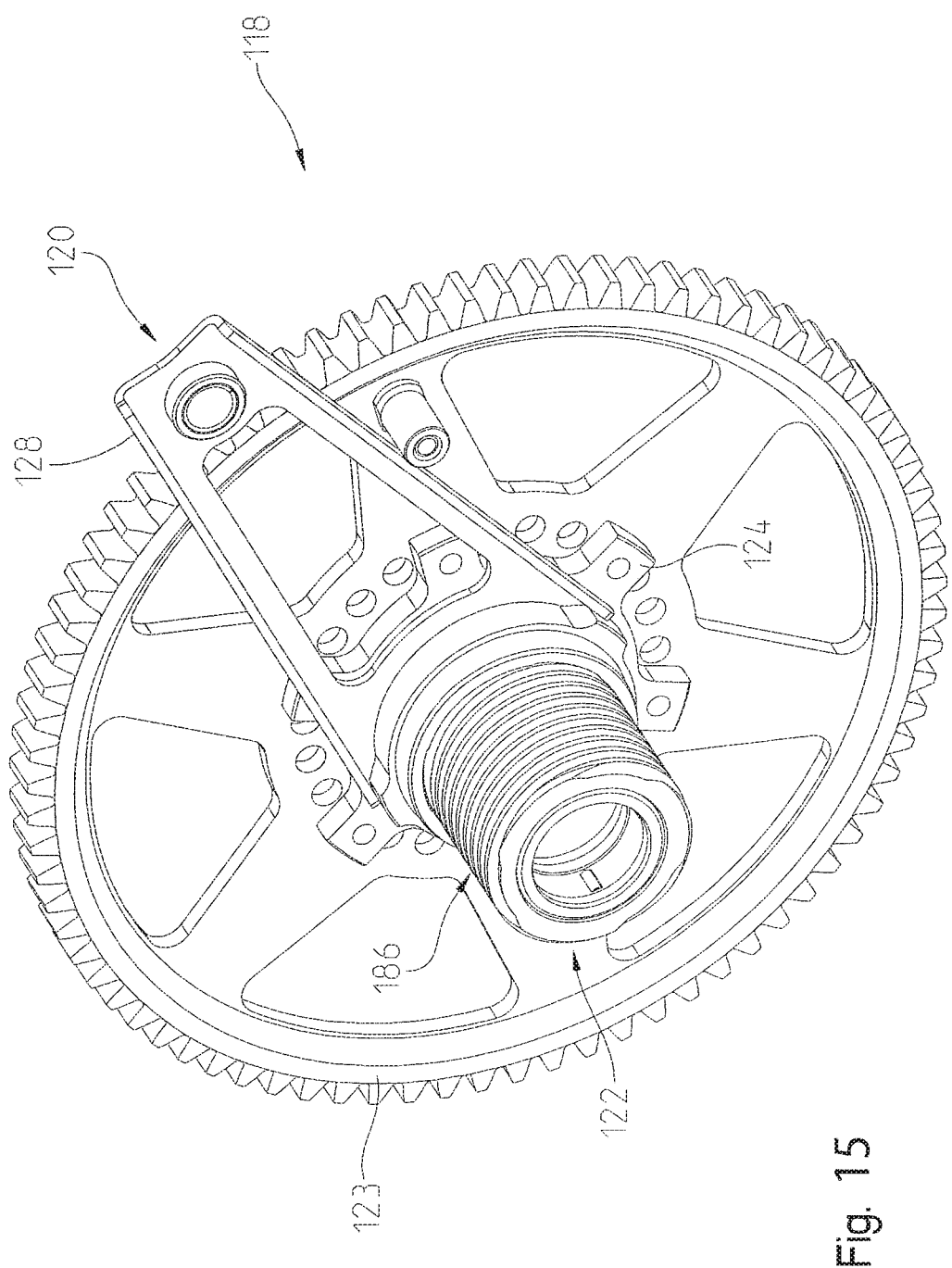
FIG. 15 is a perspective view of a lead screw assembly of the drive clutch of FIG. 14.

While friction clutch 117 is described above as a dry clutch (i.e., a clutch without oil), it is within the scope of this application that friction clutch 117 may be a wet clutch. That is friction clutch 117 may include a sealed housing with oil flowing in and out of the sealed housing and around clutch discs 117a within the sealed housing. A wet clutch has improved cooling during operation relative to a dry clutch. With reference to FIG. 13, when friction clutch 117' is a wet clutch, it is generally positioned inboard relative to the position of dry friction clutch 117, and generally positioned between CVT 48 and engine 42. In addition, friction clutch 117' is fluidly and/or structural coupled to CVT 48 and/or engine 42, and fluidly coupled to an oil tank and pump (not shown) for supplying the oil around clutch discs 117a.

Figure 16:
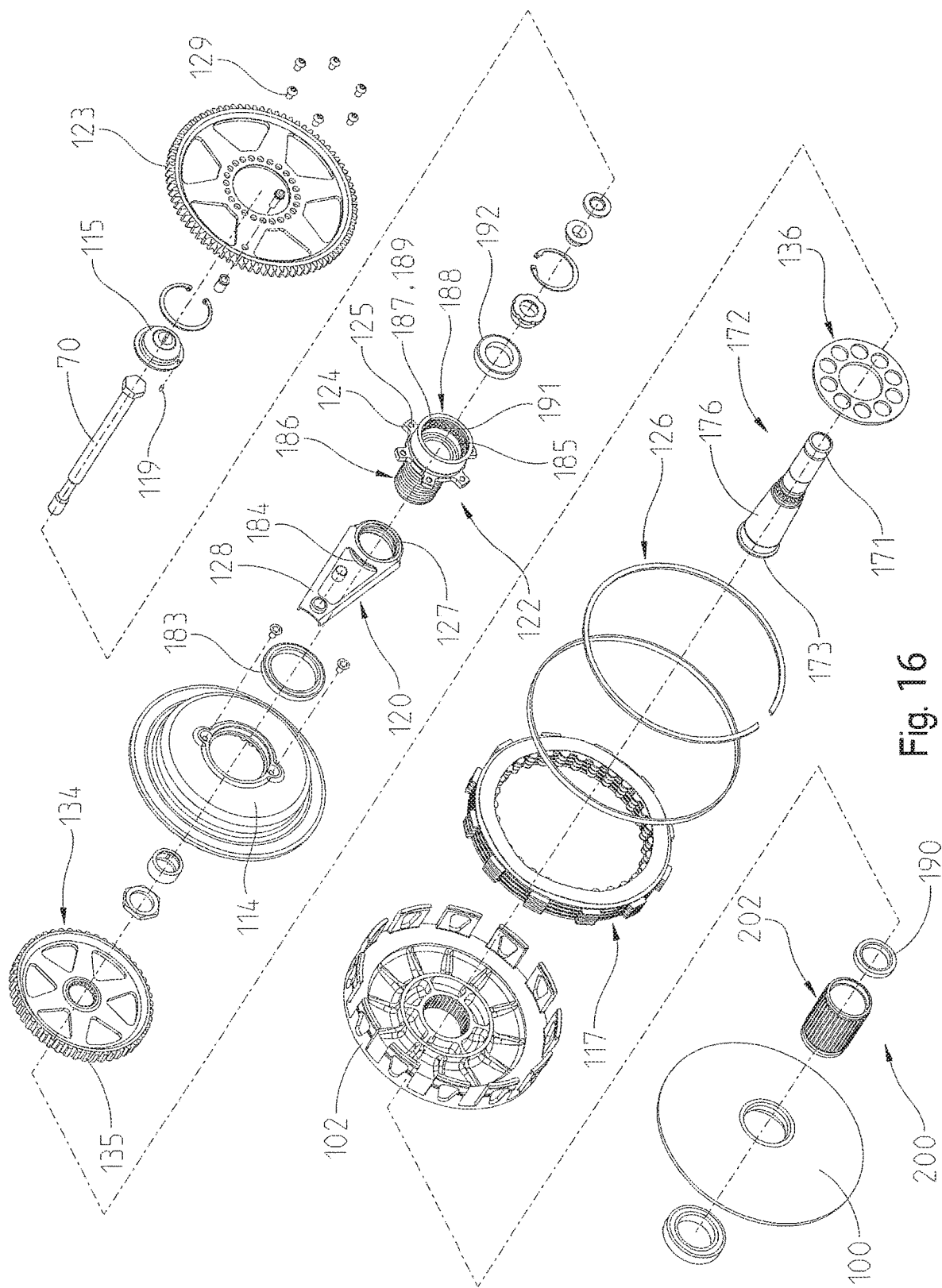
FIG. 16 is an exploded view of the drive clutch of FIG. 14.

Referring to FIGS. 9-12 and 14-16, first screw member 120 of lead screw assembly 118 includes an extended radial portion 128 and an interior threaded portion 127 (FIG. 16). Radial portion 128 is coupled to outer cover 63 of housing 60 via a coupler 121 (see FIG. 11) such that first screw member 120 is not configured to rotate due to the fixed coupling with housing 60. In one embodiment, first screw member 120 is configured for axial movement only, as disclosed further herein. First screw member 120 further includes an outer bearing support 184 which is defined internally by interior threaded portion 127 and externally by an outer surface. Outer bearing support 184 is configured to support a bearing member 183 positioned between first screw member 120 and movable hub 114. As such, movable hub 114 and bearing assembly 183 rotate together independently from first screw member 120. In the illustrated embodiment, bearing assembly 183 is press fit between movable hub 114 and outer bearing support 184 of first screw member 120.

Second screw member 122 includes an exterior threaded portion 186, an opening 188, and a shoulder 185 positioned axially between threaded portion 186 and opening 188. Threaded portion 186 includes outer threads that mate with inner threads of interior threaded portion 127 of first screw member 120. Opening 188 includes an interior surface 187 having indentions 189 for receiving a pin 119 of position sensor 113. Shoulder 185 includes a bearing support section 191 configured to support a bearing member 192. Bearing assembly 192 allows shaft 172 to rotate within second screw member 122 independently from second screw member 122. Second screw member 122 further includes a plurality of flanges 124 having apertures 125 that receive couplers 129 for coupling second screw member 122 to gear 123 (see FIGS. 14 and 16) such that second screw member 122 is configured to rotate with gear 123. In one embodiment, second screw member 122 is configured for rotational movement only.

As shown best in FIG. 16, a sliding assembly 200 of primary clutch 50 includes a sliding support 202, and a bearing member 190 positioned between sliding support 202 and input shaft 172 positioned over a coupler or bolt 70. Input shaft 172 of primary clutch 50 includes a flared body 176 that receives coupler 70 therethrough. A first end 171 of input shaft 172 engages coupler 70 and a second end 173 of input shaft 172 is spaced apart from coupler 70. Coupler 70 is configured to rotate with input shaft 172 at both engine idle (when primary clutch 50 is disengaged) and when primary clutch 50 is engaged.

Sliding support 202 is operably coupled to sheaves 100, 102 to provide a sliding interface for movable sheave 102 relative to stationary sheave 100. Movable sheave 102 is configured to slide relative to sliding support 202.

Referring to FIGS. 9 and 10, and as disclosed further herein, primary clutch 50 further includes a travel limiter 136. Travel limiter 136 is configured to limit the range of movement of movable sheave 102 to control its final fully open position. If further movement of lead screw assembly 118 is applied, then only movable hub 114 moves such that friction clutch 117 can then be disengaged (see FIG. 10). In the illustrated embodiment, the range of axial motion of first screw member 120 relative to second screw member 122 defines the maximum and minimum gear ratios provided with primary clutch 50, although other limit stops may be provided.

Figure 18:
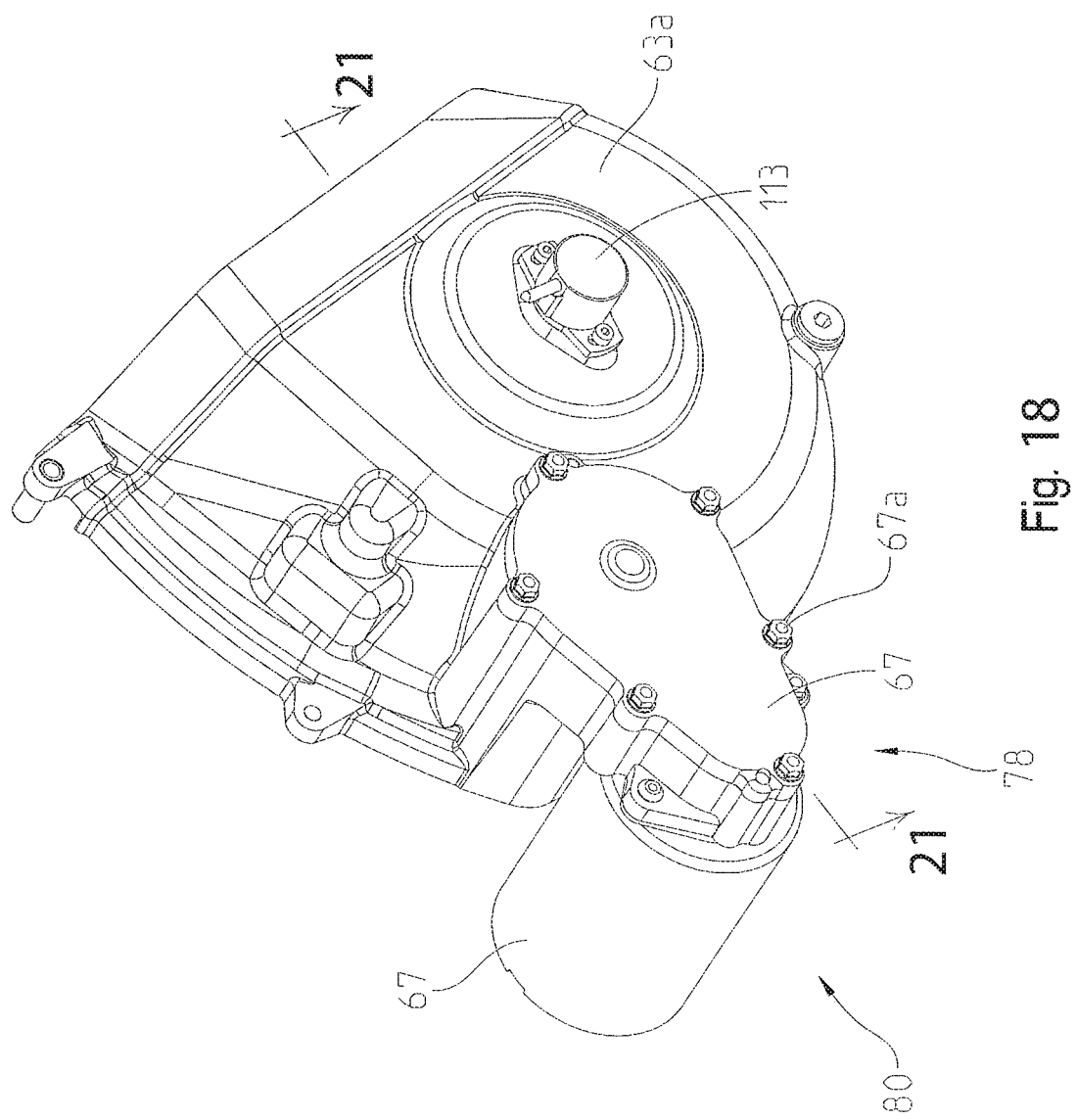
FIG. 18 is a front left perspective view of the actuator assembly and a portion of an outer cover of the CVT of FIG. 5.
Figure 19:
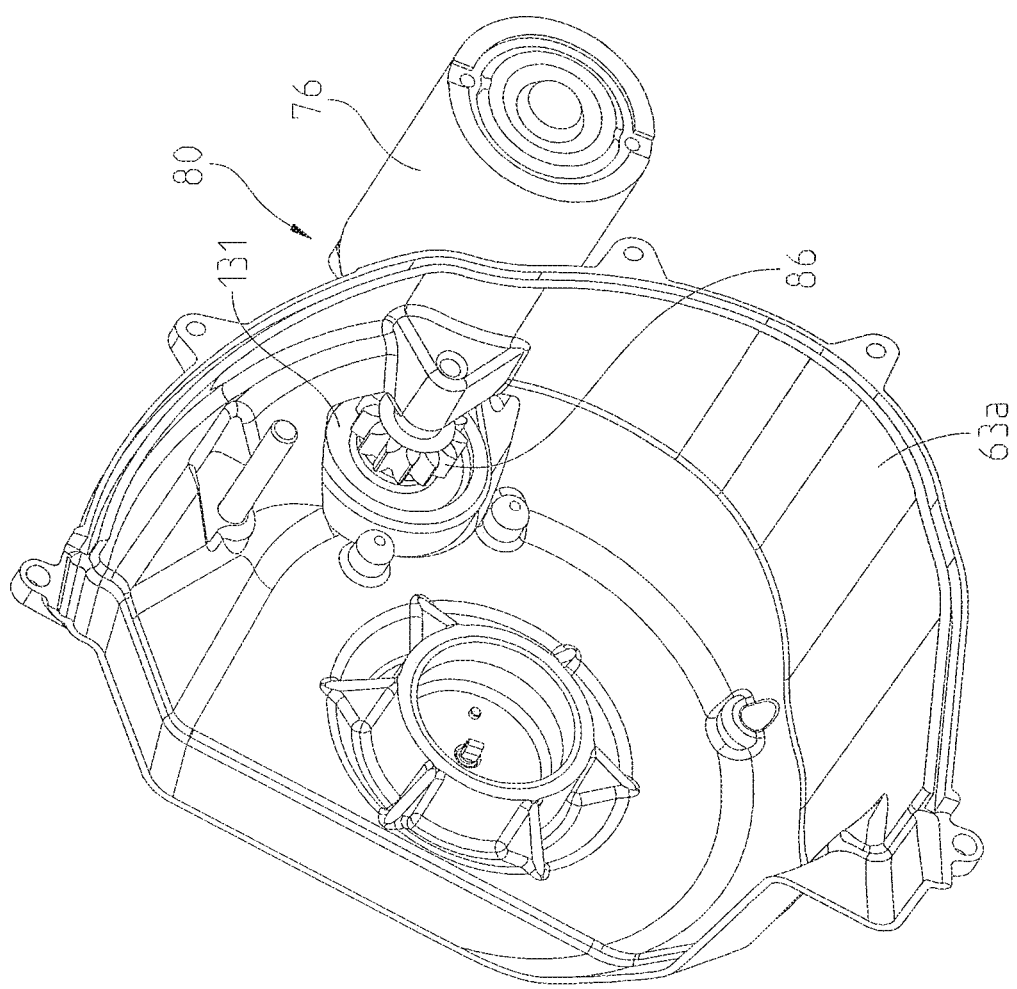
FIG. 19 is a rear right perspective view of the actuator assembly and the portion of the outer cover of FIG. 18.
Figure 20:
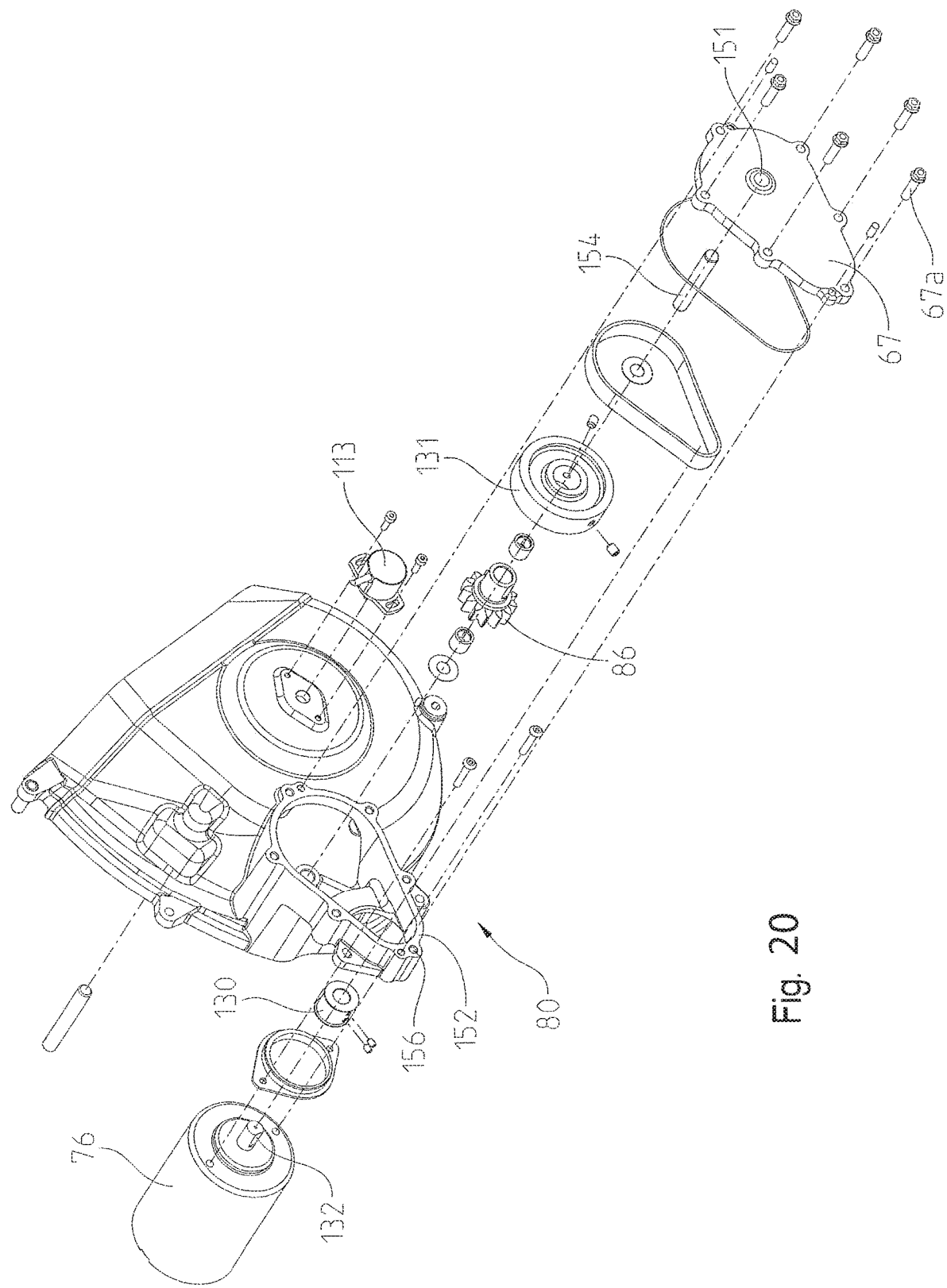
FIG. 20 is an exploded view of the actuator assembly and the portion of the outer cover of FIG. 18.
Figure 21:
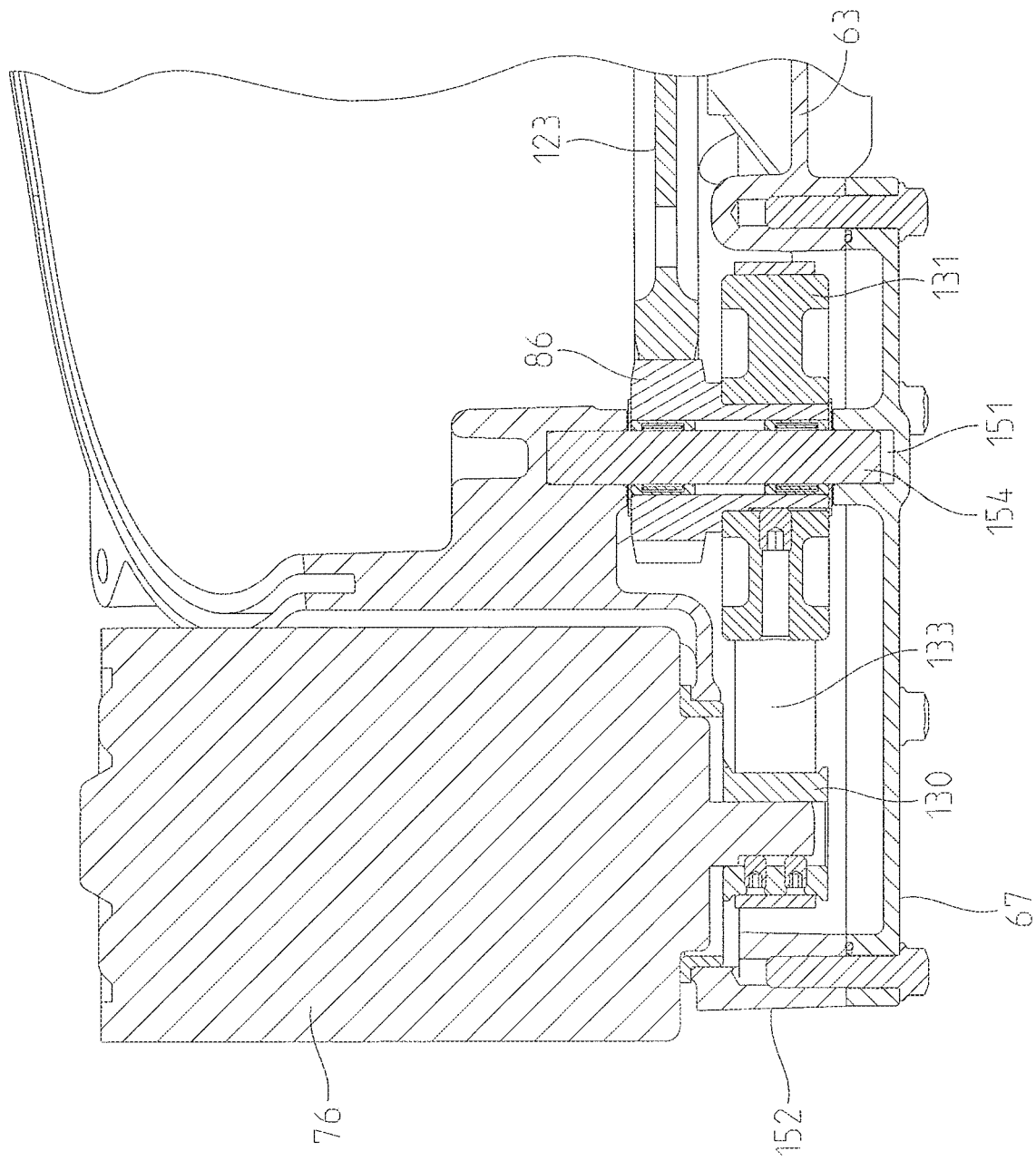
FIG. 21 is a cross-sectional view of the actuator assembly and the portion of the outer cover of FIG. 18, taken along line 21-21 of FIG. 18.

Referring to FIGS. 17 and 18, position sensor 113 is coupled to outer cover 63 of housing 60 (see FIG. 18) and a support member 115. Position sensor 113 is configured to detect the axial location of movable sheave 102 of primary clutch 50. Support member 115 is positioned within one of the indentions 189 in opening 188 of second screw member 122 and coupled to second screw member 122 via coupler 111. In various embodiments, coupler 111 may be a circlip. In addition, support member 115 includes a pin 119 configured to be received by at least one of indentions 189 of second screw member 122. Pin 119 is configured to be a locating pin for position sensor 113. In one embodiment, position sensor 113 is a rotary sensor, although a linear sensor or other suitable sensor may be provided. Sensor 113 provides position feedback to controller 36 (FIG. 2).

As illustrated in FIGS. 9 and 10, actuator assembly 80 is coupled to lead screw assembly 118 through a gear 86, as disclosed herein. Actuator assembly 80 is configured to move movable hub 114 and/or movable sheave 102 of primary clutch 50, as described herein. In the illustrative embodiment, engine 42 and sub-transmission 56 (see FIGS. 2 and 3) are configured to be positioned adjacent inner cover 62 and are positioned rearward of actuator assembly 80.

As illustrated in FIGS. 18-21, actuator assembly 80 includes motor 76 with an output shaft 132 and is operably coupled to primary clutch 50 through a belt drive assembly. The belt drive assembly includes a first gear or pulley 130, a second gear or pulley 131 rotatably coupled to first gear 130 via a belt 133, and a gear 86 positioned generally adjacent second pulley 131. In the illustrative embodiment, first and second gears 130 and 131 and belt 133 are housed within an actuator housing 78. Gear 86 engages gear 123 of lead screw assembly 118 of primary clutch 50 to actuate primary clutch 50.

Figure 22:
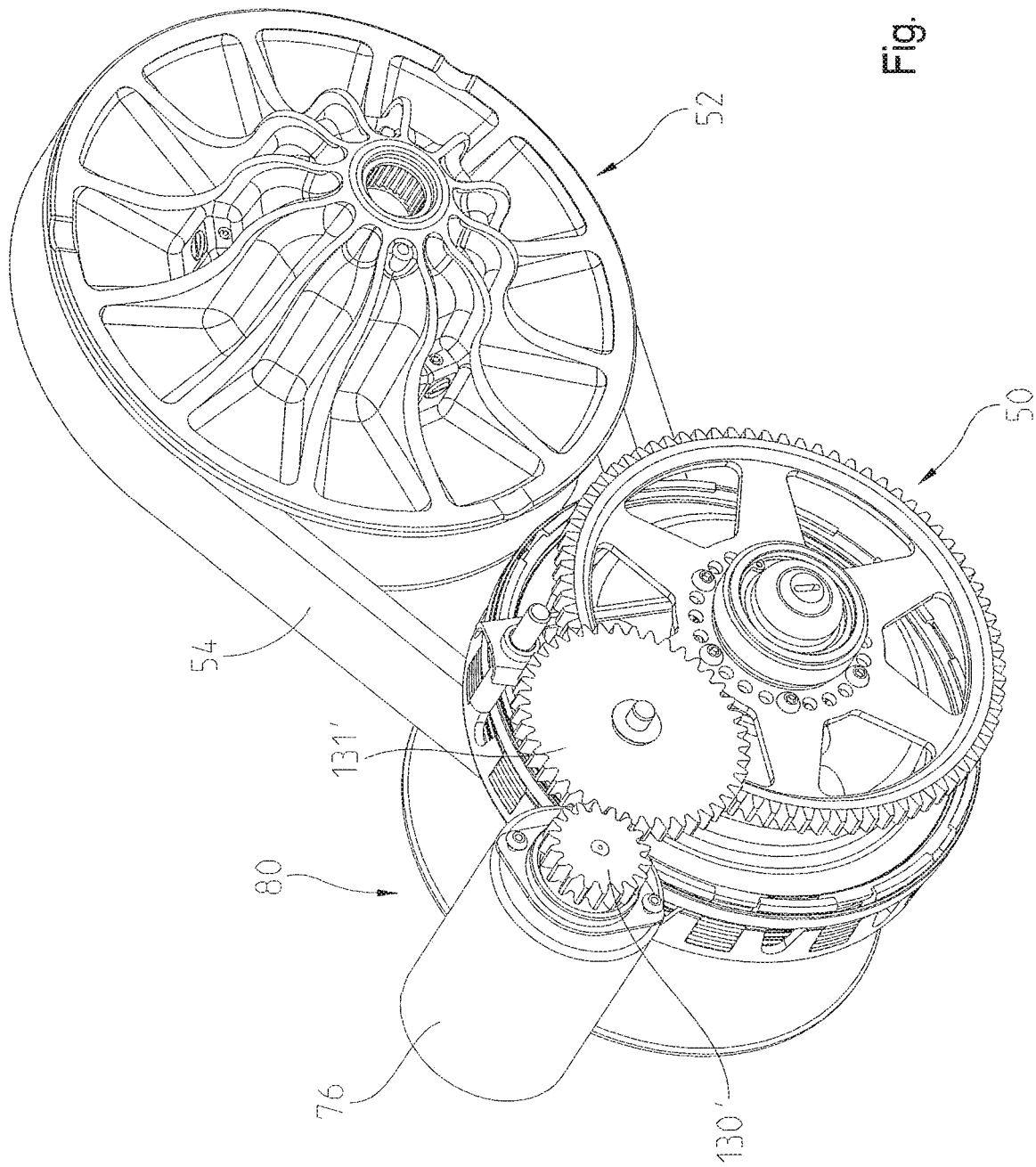
FIG. 22 is a front left perspective view of another embodiment of the actuator assembly with the drive clutch and the driven clutch of FIG. 5.
Figure 23:
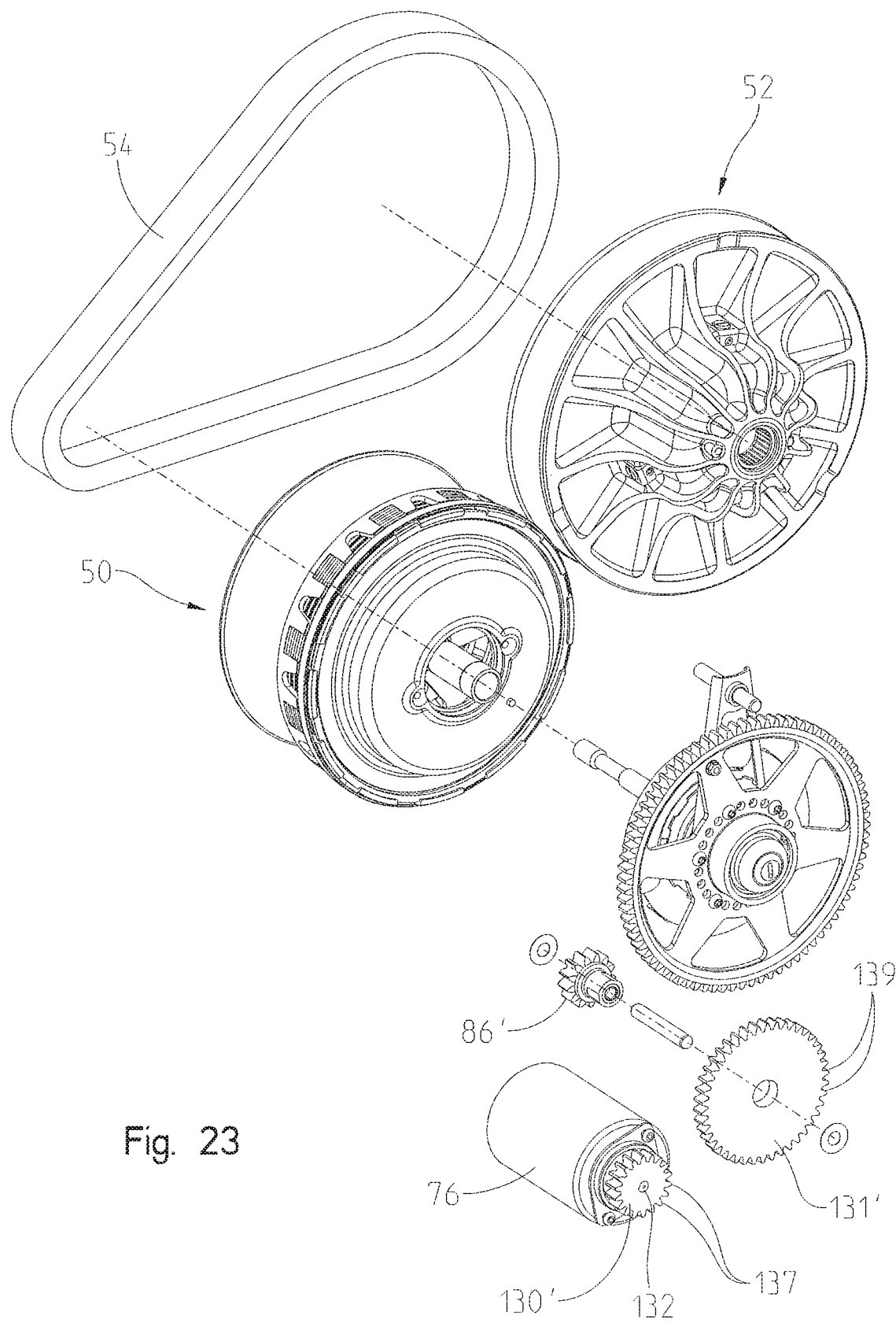
FIG. 23 is an exploded view of the actuator assembly, the drive clutch, and the driven clutch of FIG. 22.

In various embodiments, actuator assembly 80 is coupled to primary clutch 50 through a gear drive assembly, as shown in FIGS. 22 and 23. The gear drive assembly includes a first gear or sprocket 130' having teeth 137 and coupled to shaft 132 of motor 76, a second gear or sprocket 131' having teeth 139 positioned to engage teeth 137 of first gear 130', and a gear 86' coupled to second gear 131'. In one embodiment, first and second gears 130' and 131'are housed within an actuator housing (not shown) similar to housing 78 for gears 130 and 131. As can be seen in FIG. 22, when actuator assembly 80 is coupled to primary clutch 50 through the gear drive assembly, actuator assembly 80 may be positioned higher than the belt drive assembly shown in FIG. 21. This positioning allows the longitudinal footprint of the overall assembly to be shorter and therefore allows tighter packaging of the overall assembly within a vehicle.

Actuator housing 78 includes cover 67 and a base portion 152. Base portion 152 includes flange portions 156 each configured to receive a fastener 67a (see FIG.20) for coupling cover 67 to base portion 152. In the illustrated embodiments, base portion 152 is integrally formed with outer cover 63, although in other embodiments, base portion 152 may be removably coupled to outer cover 63. Cover 67 includes an opening 151 (see FIG. 20) that receives a shaft 154 configured to support gear 86 and second gear 131. In various embodiments, opening 151 is a blind bore opening within cover 67 such that it does not pass completely through cover 67.

In operation, CVT 48 is engaged when primary clutch 50 is at the fully open position and the actuation of gear 86 by motor 76 (see FIG. 22) is configured to modulate the gear ratio provided by primary clutch 50. To initiate actuation of gear 86 by motor 76, controller 36 first receives a user input from clutch input 116, a throttle input indicating a desired or actual engine condition, or other various input parameters from controller 36, engine 42, and/or any other component of vehicle 10 to initiate operation of motor 76. Controller 36 then initiates or actuates motor 76 if the one or more input received by controller 36 indicates that CVT 48 should be actuated.

The operation of motor 76 causes output shaft 132 of motor 76 to rotate which allows first gear 130 to also rotate. The rotation of first gear 130 results in rotation of belt 133 which causes rotation of second gear 131. Because gear 86 is operably coupled to second gear 131, the rotation of second gear 131 is transfer to gear 86 (see FIG. 21). Rotation of gear 86 thereby rotates gear 123 of lead screw assembly 118 and thus second screw member 122 of primary clutch 50. Second screw member 122 is axially stationary and rotates due to the rotation of gear 123 independent of a rotation of shaft 172.

Referring to FIGS. 9 and 10, rotation of second screw member 122 in a first direction moves threaded portion 127 of first screw member 120 along threaded portion 186 of second screw member 122, thereby causing first screw member 120 to slide axially along second screw member 122 towards stationary sheave 100 while remaining rotationally stationary. The axial movement of first screw member 120 provides a thrust force against movable hub 114 via bearing assembly 192 to engage spring member 126. Movable hub 114 is configured for axial or sliding movement along a support member 134 (FIG. 16) due to the engagement of external threads or splines 135 on support member 134 and internal threads or splines (not shown) on movable hub 114. In particular, support member 134 is supported on shaft 172 and is configured to transfer torque from engine 42 and through shaft 172 for movement of movable hub 114. Spring member 126 then provides a thrust force against friction clutch 117 to engage friction clutch 117. After friction clutch 117 has been engaged, the additional thrust force caused by continued axial movement of movable hub 114 allows for axial movement of movable sheave 102 towards stationary sheave 100. As such, the thrust force provided by first screw member 120 is applied to movable sheave 102 through friction clutch 117 and movable hub 114.

In this way, actuator assembly 80 engages movable hub 114 without initially engaging friction clutch 117 or movable sheave 102, thereby allowing operation of CVT 48 without the need to clutch at belt 54. More particularly, because belt 54 is always engaged with movable sheave 102, clutching occurs through friction clutch 117, rather than belt 54. As such, belt 54 may experience less wear because belt 54 is not periodically engaged and disengaged from movable sheave 102, but instead, remains in continuous contact and engagement with moveable sheave 102. Additionally, as noted herein friction clutch 117 cannot clutch at every position of primary clutch 50 and, rather, only clutches when primary clutch 50 in the fully open position (i.e., sheaves 100, 102 are the furthest axial distance from each other) because belt 54 provides a force against movable sheave 102 which allows for the clutching to occur at friction clutch 117.

As movable hub 114 is actuated for axial movement towards friction clutch 117, spring member 126 is engaged to facilitate the pressure or force transferred from movable hub 114 to friction clutch 117. Therefore, friction clutch 117 is engaged by continued axial movement of movable hub 114 and engagement of spring member 126. However, it is to be noted that the engagement of movable hub 114, spring member 126, and friction clutch 117 initially occurs without movement of movable sheave 102. Only after friction clutch 117 is engaged and movable hub 114 continues to move axially in response to actuator assembly 80 does movable sheave 102 start to move towards stationary sheave 100 and change a position of belt 54 within slot 104. Controller 36 controls the axial movement of movable sheave 102 to a position requirement to meet the desired gear ratio, which may be any position between a fully closed position (FIG. 10) and a fully open position (FIG. 9).

When it is necessary to move movable sheave 102 away from stationary sheave 100, rotation of second screw member 122 in a second, opposite direction allows for outward movement of movable sheave 102 through outward movement of first screw member 120 along second screw member 122 and movable hub 114, thereby allowing a force applied by belt 54 against movable sheave 102 to move movable sheave 102 outward or away from stationary sheave 100. More particularly, a force from secondary clutch 52 is applied to primary clutch 50 through belt 54 which facilitates opening primary clutch 50. As sufficient force is applied by belt 54, movable sheave 102 moves axially away from stationary sheave 100 until the desired position set by first screw member 120 and movable hub 114 or a maximum limit is met (e.g., movable sheave 102 is in the fully open position (FIG. 10)), and then friction clutch 117 and spring member 126 will disengage from movable hub 114.

In the illustrated embodiment, actuator assembly 80, lead screw assembly 118, and friction clutch 117 allow primary clutch 50 to be disengaged when engine 42 (see FIG. 2) is at or below engine idle speed and up to a maximum engine speed determined by a RPM or speed limiter of engine 43. In this way, clutching is not connected to a particular engine speed and, instead, CVT 48 is configured for clutching at any desired engine speed. The actuating function of primary clutch 50 is performed by motor 76 of actuator assembly 80 via controller 36 (see FIG. 2), and the engagement of primary clutch 50 is controlled by controller 36.

Figure 11:
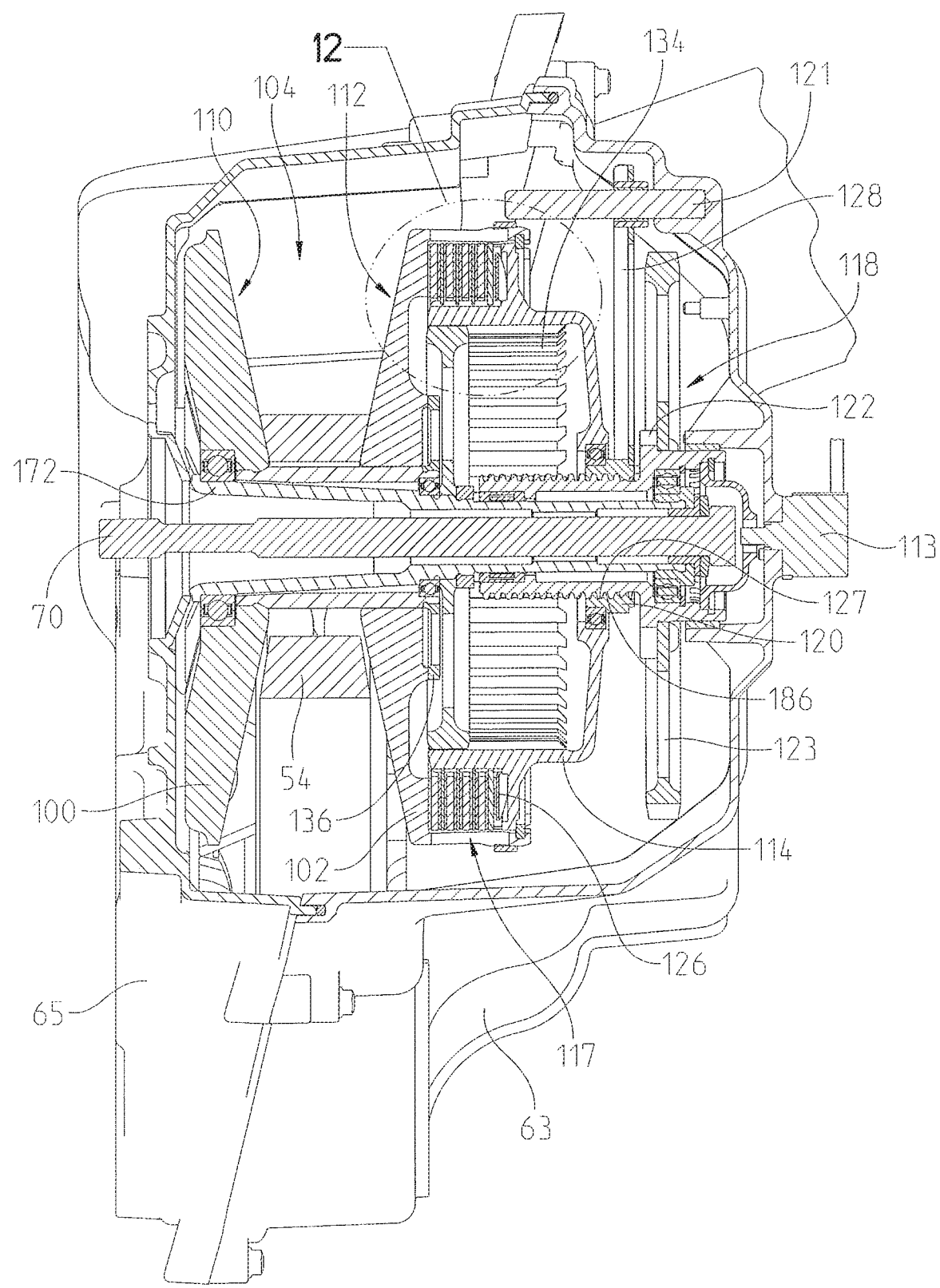
FIG. 11 is a cross-sectional view of the CVT of FIG. 3, taken along line 11-11 of FIG. 3, and showing the CVT in the open position.
Figure 12:
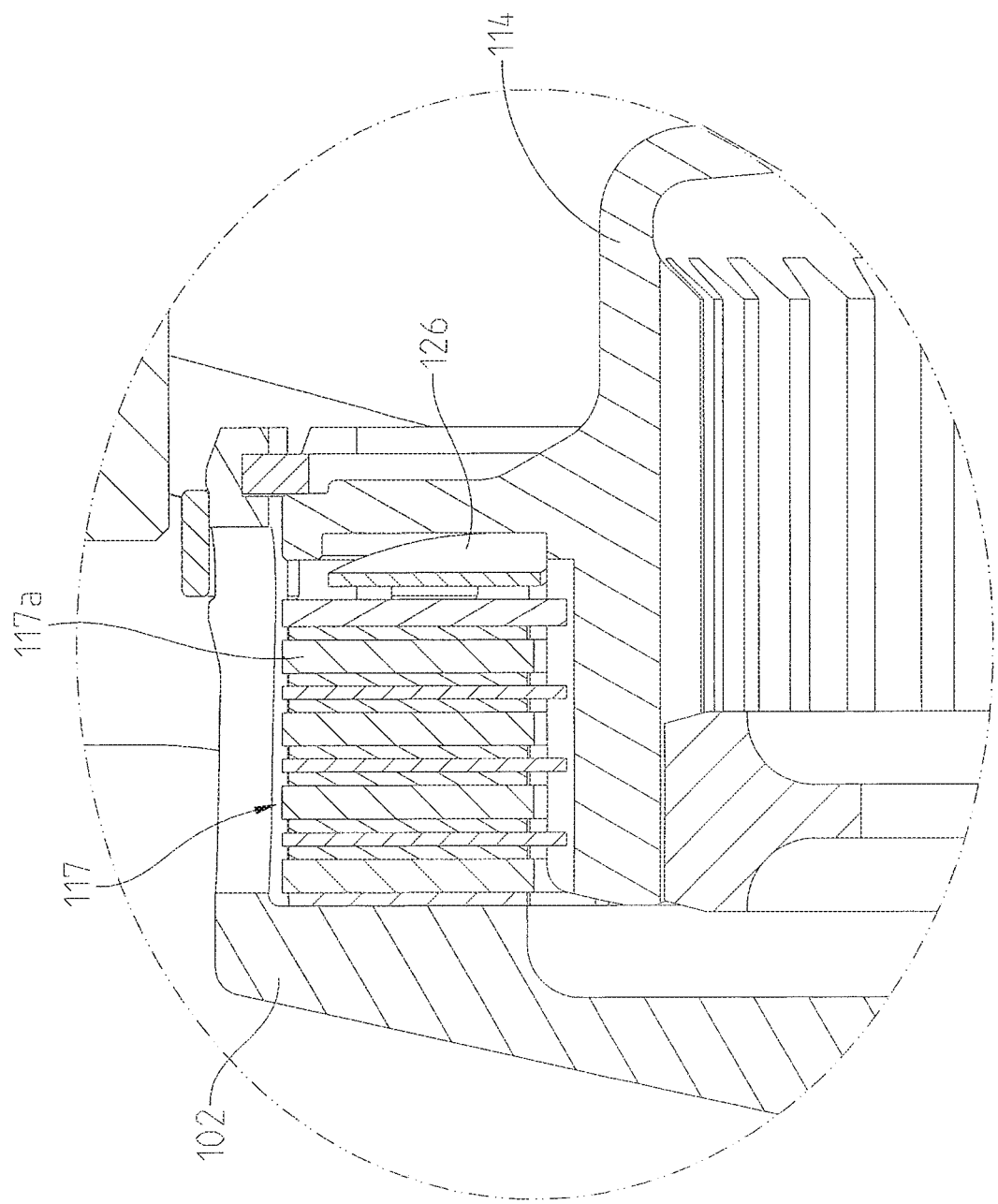
FIG. 12 is a detailed cross-sectional view of a friction clutch of the drive clutch of FIG. 11.

In one embodiment, the pressure applied to movable sheave 102 via actuator assembly 80 is modulated to achieve a desired gear ratio of CVT 48 and/or a desired pinch force on belt 54. As illustrated in FIGS. 9-11, position sensor 113 is configured to detect the linear position of movable sheave 102 and provide a corresponding signal to controller 36 with the detected position data. As such, the position of sheave 102 may be monitored during operation.

Figure 24:
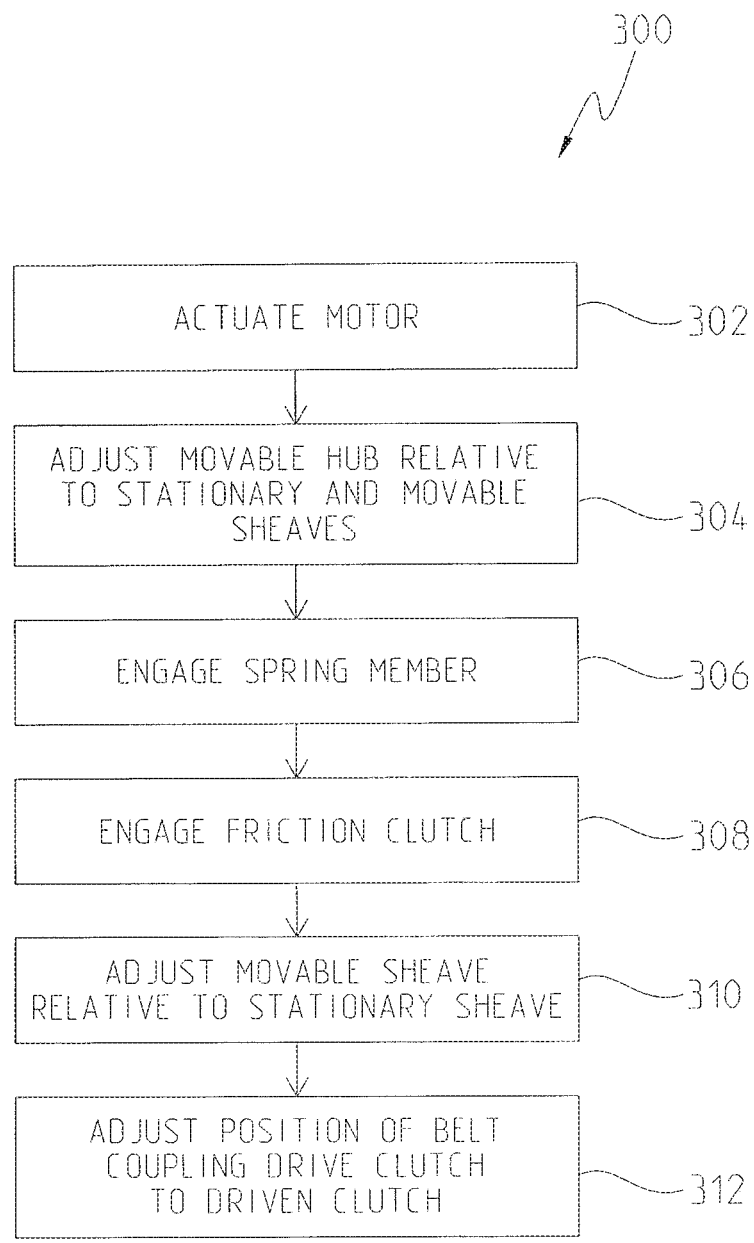
FIG. 24 is a flow chart illustrating the steps of a method of actuating the CVT of the present disclosure.

Referring to FIG. 24, an illustrative control strategy 300 is illustrated for moving movable sheave 102 of primary clutch 50. Control strategy 300 is illustratively implemented by controller 36 of FIG. 2, although another control unit of vehicle 10 may be used. As disclosed herein, at block 302, motor 76 of actuator assembly 80 is actuated by controller 36. In one embodiment, actuation of motor 76 is in response to input from clutch input 116. Once motor 76 is actuated, rotational movement created by motor 76 is transferred to lead screw assembly 118 of primary clutch 50 through the belt drive assembly such that movable hub 114 is adjusted relative to stationary and movable sheaves 100 and 102, as illustrated at block 304. At block 306, as movable hub 114 moves axially in a direction parallel to shaft 172 of primary clutch 50, movable hub 114 engages spring member 126. With further axial movement of movable hub 114, spring member 126 and movable hub 114 provide a force against friction clutch 117 to engage friction clutch 117 prior to any movement of movable sheave 102, as illustrated at block 308. Starting at block 310, once friction clutch 117 is engaged, movable sheave 102 may be configured to move axially relative to stationary sheave 100 in order to change a position of belt 54 within slot 104 (see block 312) and effectuate different gear ratios during operation of CVT 48 based on engine operating conditions, a user input to clutch input 116, etc. In this way, it is possible to engage friction clutch 117 without clutching at belt 54 such that CVT 48 is configured to operate at various engine speeds (e.g., idle or low RPM) without clutching at belt 54. As such, wear on belt 54 may be reduced.

While this invention has been described as having an illustrative design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A continuously variable transmission comprising:
a drive clutch having a first shaft, a first stationary sheave supported by the first shaft, a first movable sheave supported by the first shaft, a movable hub supported by the first shaft, and a friction clutch positioned between the movable hub and the movable sheave; and
an actuator motor operably coupled to the drive clutch and configured to adjust a position of the movable hub relative to the first stationary sheave of the drive clutch.

2. The continuously variable transmission of claim 1, wherein the actuator motor is configured to actuate the friction clutch and change a position of the movable sheave relative to the stationary sheave.

3. The continuously variable transmission of claim 1, further comprising a belt drive assembly operably coupled to the first shaft and the actuator motor, and the actuator motor is configured to actuate rotational movement of the drive clutch through the belt drive assembly.

4. The continuously variable transmission of claim 3, wherein the belt drive assembly includes a first gear operably coupled to the actuator motor, a second gear operably coupled to the drive clutch, and a belt operably coupled to the first and second gears.

5. The continuously variable transmission of claim 1, further comprising a spring member positioned between the movable hub and the friction clutch, wherein the spring member is configured to actuate the friction clutch in response to movement of the movable hub.

6. The continuously variable transmission of claim 5, wherein the spring member is configured to transfer force from the actuator motor to the friction clutch.

7. The continuously variable transmission of claim 5, wherein the spring member is a wave washer.

8. The continuously variable transmission of claim 1, wherein the movable hub is configured to be movably actuated when the first movable sheave is stationary.

9. The continuously variable transmission of claim 7, wherein the friction clutch is defined by of a plurality of discs comprising friction material.

10. The continuously variable transmission of claim 7, wherein the friction clutch is positioned adjacent an inner surface of the first movable sheave.

11. A continuously variable transmission comprising:
a drive clutch having a stationary sheave and a movable sheave;
an actuator motor operably coupled to the drive clutch to adjust a position of the drive clutch;
a lead screw assembly operably coupled to the drive clutch and the actuator motor and configured to engage the drive clutch in response to the actuator motor; and
wherein the drive clutch further includes a movable hub and a friction clutch positioned between the movable hub and the movable sheave, wherein the actuator motor is configured to adjust a position of the movable hub relative to the movable sheave and the stationary sheave through the engagement of the lead screw assembly with the drive clutch.

12. The continuously variable transmission of claim 11, wherein the lead screw assembly includes a first member and a second member, the first member configured for axial movement and the second member configured for rotational movement.

13. The continuously variable transmission of claim 12, wherein the first member is configured for axial movement only and the second member is configured for rotational movement only.

14. The continuously variable transmission of claim 12, wherein the first member includes interior threads and the second member includes exterior threads, the interior threads of the first member are configured to engage with the exterior threads of the second member.

15. The continuously variable transmission of claim 12, wherein the lead screw assembly further includes an outer gear operably coupled to the actuator motor through a belt.

16. A continuously variable transmission comprising:
a drive clutch having a first shaft, a first stationary sheave supported by the first shaft, a first movable sheave supported by the first shaft, a movable hub supported by the first shaft, and a friction clutch positioned between the movable hub and the first movable sheave;
a belt configured to be drivingly coupled to the drive clutch; and
an actuator motor operably coupled to the drive clutch and configured to engage the friction clutch, and clutching occurs through the friction clutch.

17. The continuously variable transmission of claim 16, wherein the drive clutch further includes a spring member positioned between the movable hub and the friction clutch, the spring member being configured to actuate the friction clutch prior to a position of the first movable sheave being changed relative to the first stationary sheave.

18. The continuously variable transmission of claim 17, wherein the spring member is a wave washer.

19. The continuously variable transmission of claim 17, wherein the actuator motor is configured to actuate the friction clutch through the spring member and change the position of the movable sheave relative the stationary sheave.

20. The continuously variable transmission of claim 19, further comprising a lead screw assembly, wherein the actuator motor changes the position of the movable sheave relative to the stationary sheave through the lead screw assembly.

21. The continuously variable transmission of claim 20, wherein the lead screw assembly includes a first member and a second member, and the first member is configured for axial movement and the second member is configured for rotational movement.

22. A control system for operating an electronically-controlled continuously variable transmission having a drive clutch including a movable sheave, a stationary sheave, a movable hub, and a friction clutch, the control system comprising:
an actuator motor; and
a controller operably coupled to the actuator motor, and the controller is configured to:
actuate the actuator motor;
adjust a position of the movable hub of the drive clutch relative to the stationary and movable sheaves of the drive clutch; and
engage the friction clutch of the drive clutch, the friction clutch positioned between the movable hub and the first movable sheave.

23. The control system of claim 22, wherein the controller is further configured to adjust a position of the movable sheave relative to the stationary sheave.

24. The control system of claim 23, wherein the controller is configured to adjust the position of the movable sheave after the friction clutch has been engaged.

25. The control system of claim 22, further including a driven clutch including a movable sheave and a stationary sheave, and including a belt extending between the drive clutch and the driven clutch, wherein the controller is further configured to adjust a position of the belt of the continuously variable transmission after engaging the friction clutch of the drive clutch.

26. The continuously variable transmission of claim 11 further including a control system for operating the continuously variable transmission, the control system comprising a controller operably coupled to the actuator motor, and the controller is configured to: actuate the actuator motor; adjust a position of the movable hub of the drive clutch relative to the stationary and movable sheaves of the drive clutch; and engage the friction clutch of the drive clutch.

* * * * *